United States Patent [19]

Saito et al.

[11] Patent Number: 5,593,517
[45] Date of Patent: Jan. 14, 1997

[54] REGENERATING MATERIAL AND REFRIGERATOR USING THE SAME

[75] Inventors: Akiko Saito, Kawasaki; Masashi Sahashi; Yoichi Tokai, both of Yokohama; Akihiko Tsutai, Kawasaki; Masami Okamura, Yokohama; Yukiko Nishiyama, Kawaguchi; Michihiko Inaba, Yokohama, all of Japan

[73] Assignee: Kabushiki Kaisha Toshiba, Kawasaki, Japan

[21] Appl. No.: 305,916

[22] Filed: Sep. 15, 1994

[30] Foreign Application Priority Data

Sep. 17, 1993 [JP] Japan .................................. 5-253698

[51] Int. Cl.$^6$ ........................................................ H01F 1/055
[52] U.S. Cl. ........................ 148/301; 420/416; 62/3.1; 62/6
[58] Field of Search ........................ 148/301, 303; 420/416; 62/3.1, 6

[56] References Cited

U.S. PATENT DOCUMENTS

| | | |
|---|---|---|
| 4,946,501 | 8/1990 | Nate et al. ............................. 148/301 |
| 4,957,549 | 9/1990 | Matsumoto et al. .................... 148/301 |
| 4,985,072 | 1/1991 | Sahashi et al. . |
| 5,186,765 | 2/1993 | Arai et al. . |
| 5,224,657 | 7/1993 | Kuriyama et al. . |
| 5,269,854 | 12/1993 | Takahashi et al. . |
| 5,332,029 | 7/1994 | Tokai et al. . |

FOREIGN PATENT DOCUMENTS

| | | |
|---|---|---|
| 0327293 | 8/1989 | European Pat. Off. . |
| 0411591 | 2/1991 | European Pat. Off. . |
| 64-48403 | 2/1989 | Japan .................................. 148/302 |

*Primary Examiner*—John Sheehan
*Attorney, Agent, or Firm*—Oblon, Spivak, McClelland, Maier & Neustadt, P.C.

[57] ABSTRACT

The regenerating material according to the present invention comprises two alloy phases which differ in a content of rare earth elements. Of these alloy phases, a dominant phase in the regenerating material is defined as a main phase, and the other phase is defined as a sub-phase. A plurality of particles, each of which consists of a granular main phase and a sub-phase present on the surface of the main phase, gathers to form an aggregate. Otherwise, a sub-phase present in a main phase in the form of fiber. The refrigerator according to the present invention comprises a regenerator charged with above-mentioned regenerating material, a coolant gas and an expansion means for expanding the coolant gas.

14 Claims, 18 Drawing Sheets

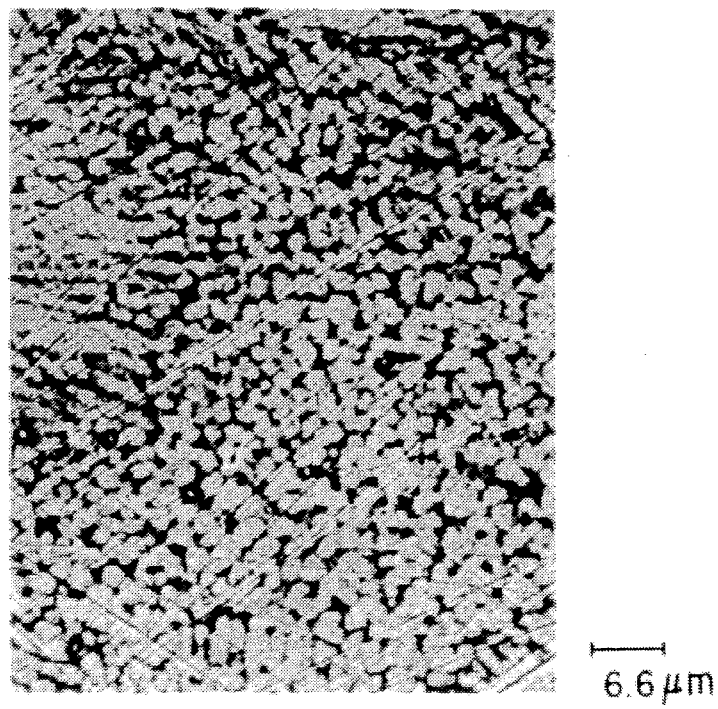
F I G. 9
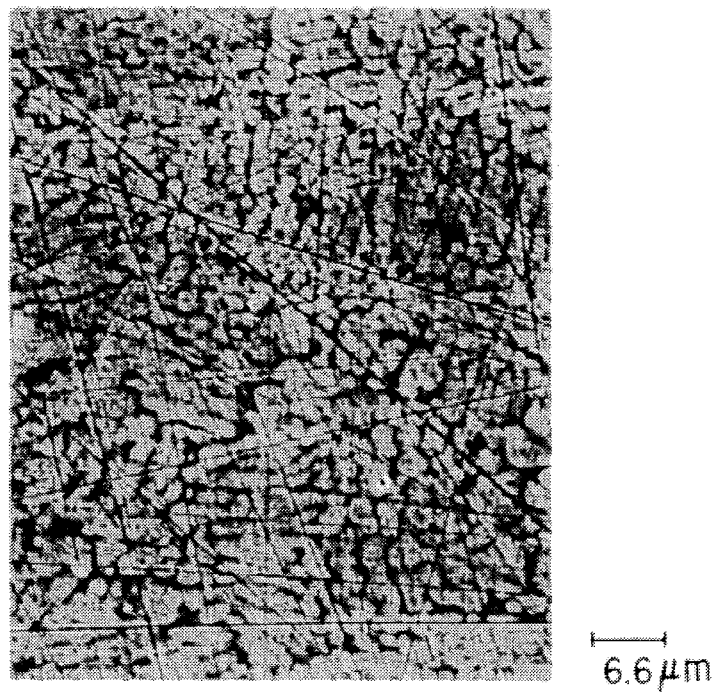
F I G. 10

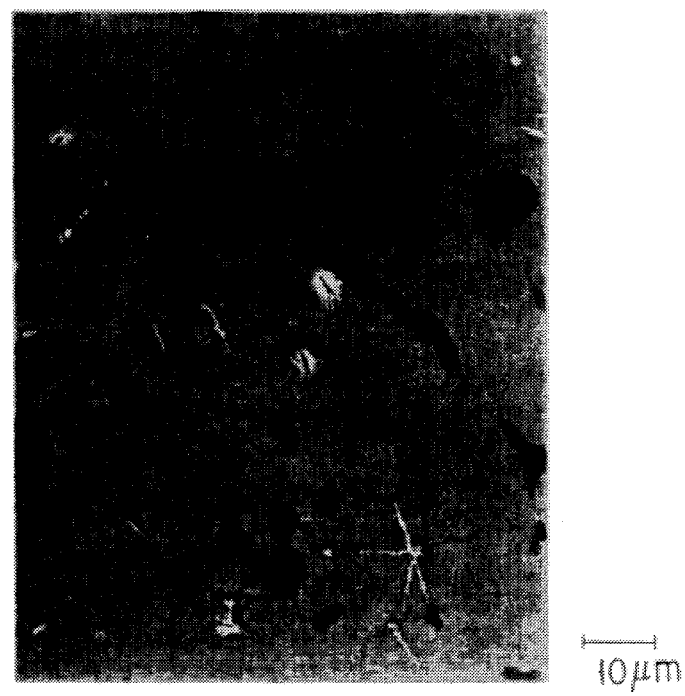
F I G. 13
F I G. 14

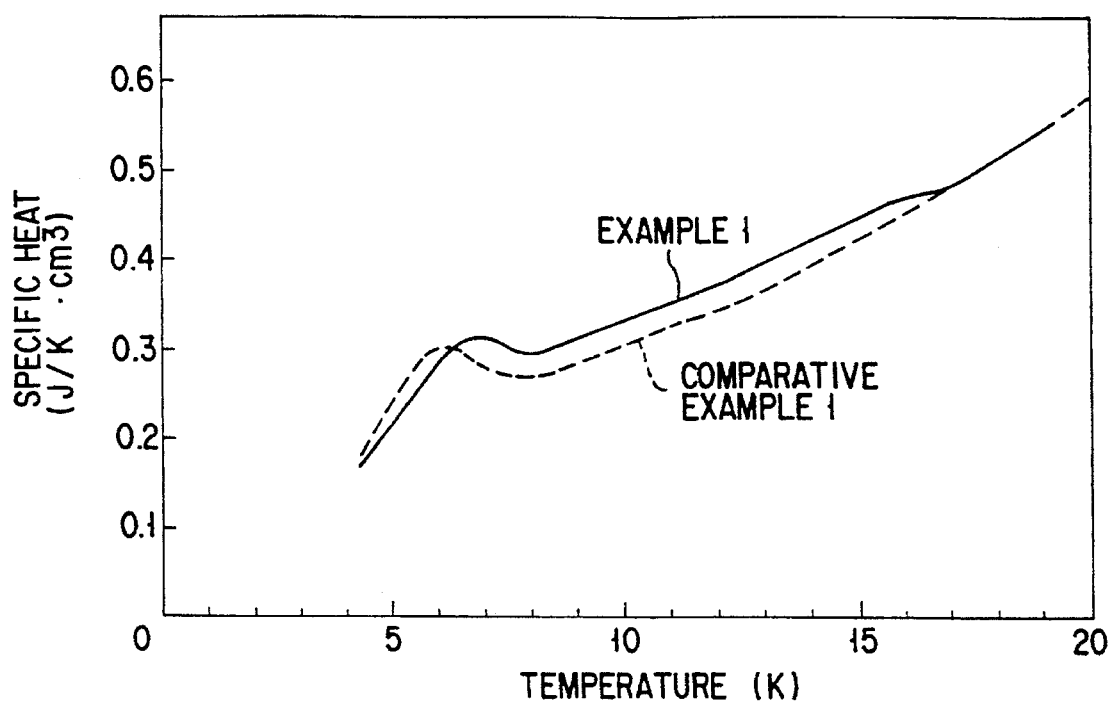
F I G. 15
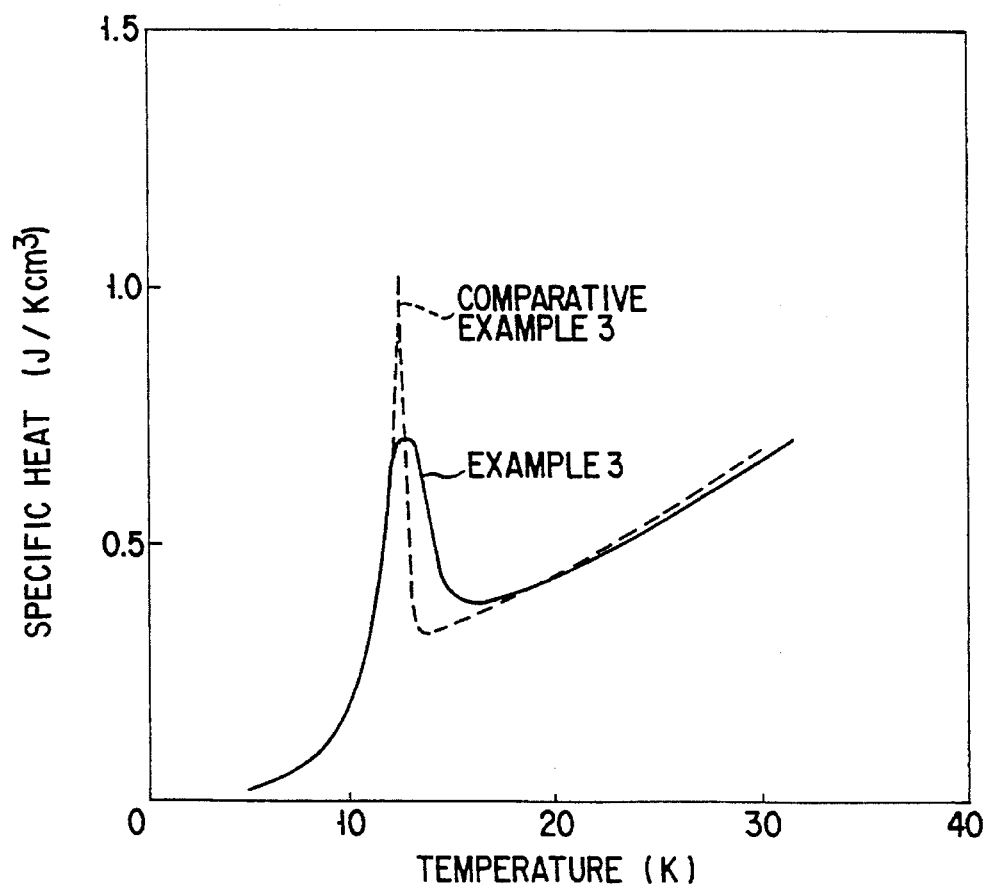
F I G. 16

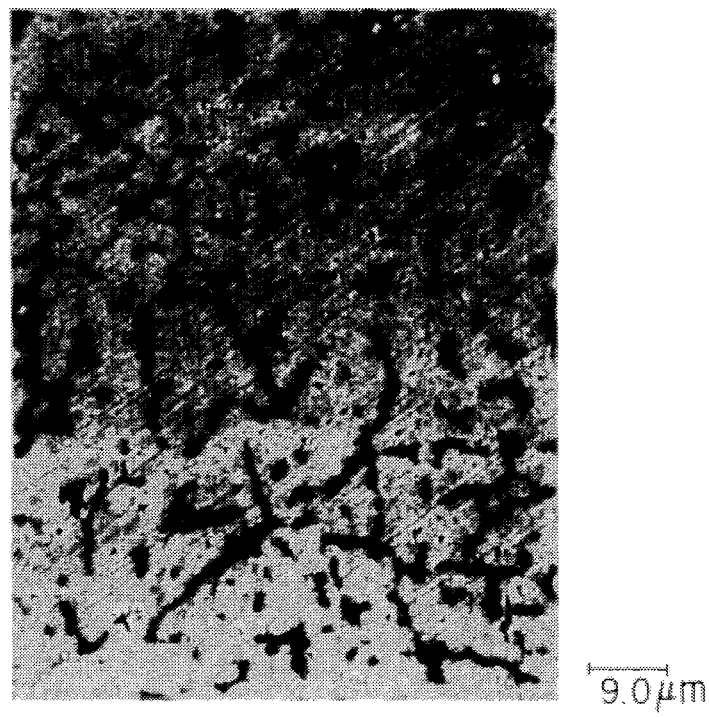
F I G. 17
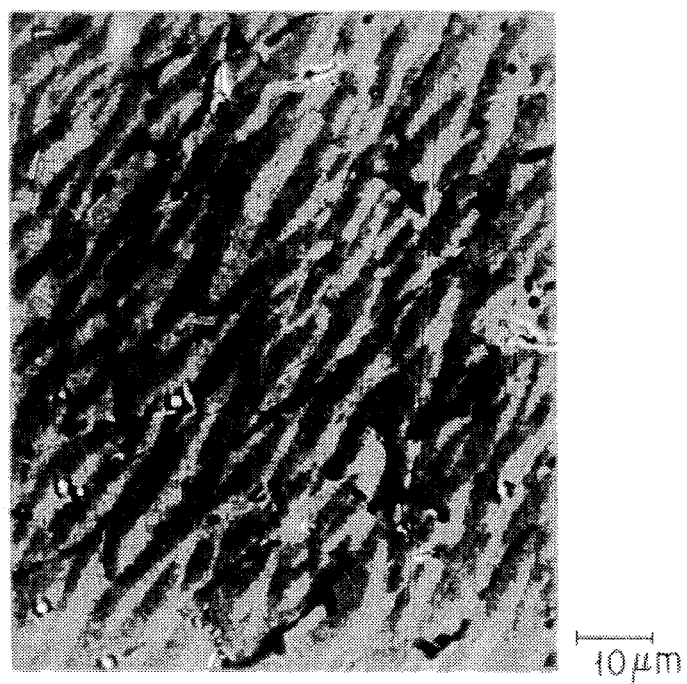
F I G. 18

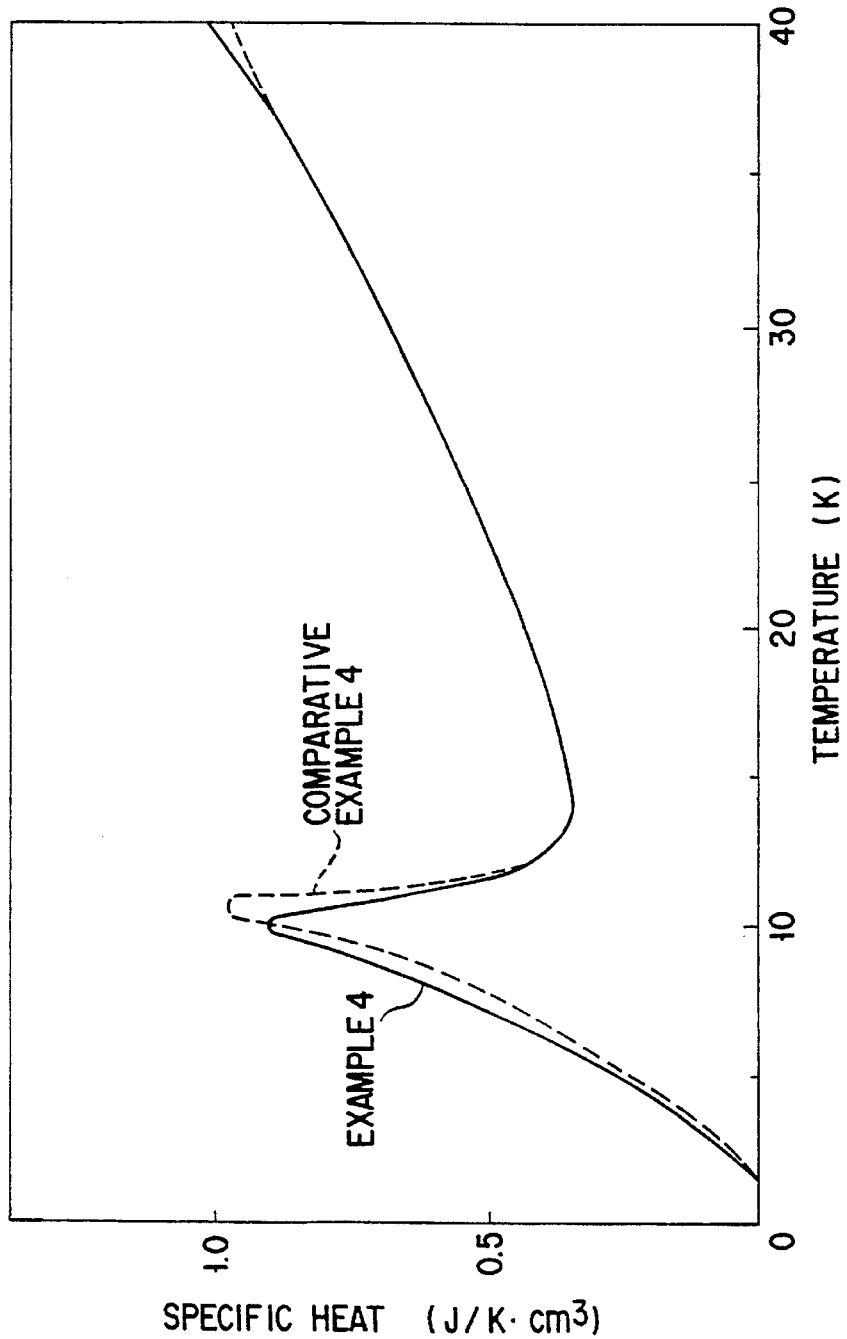
F I G. 19

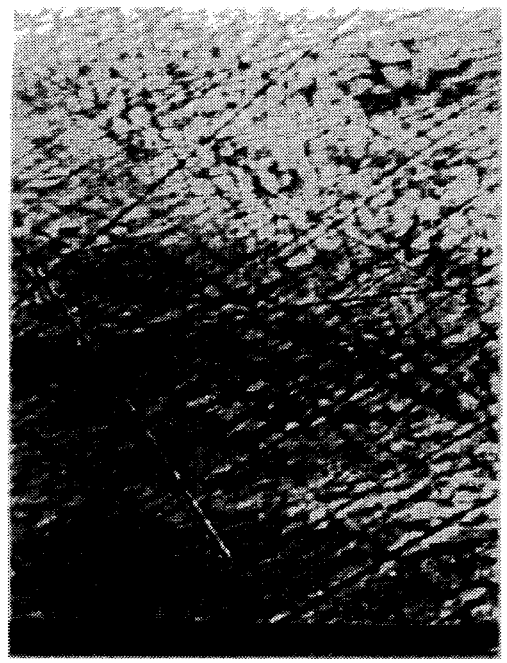
F I G. 26
F I G. 27

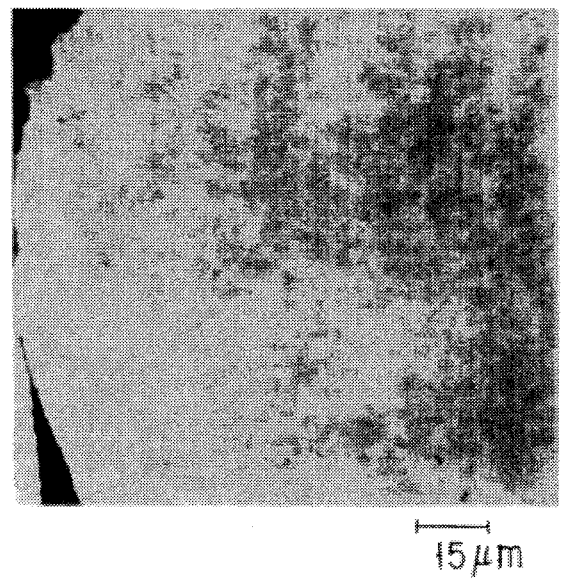
F I G. 28
15μm
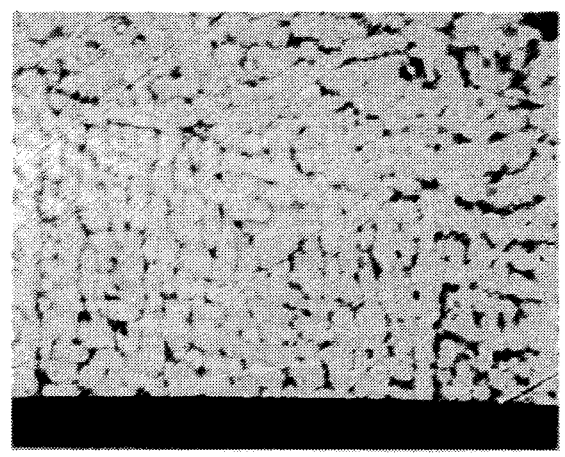
F I G. 29
F I G. 30

15μm

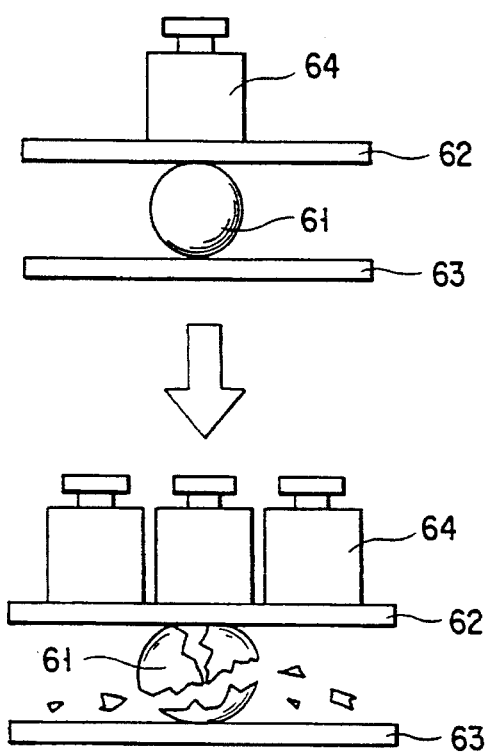
F I G. 36
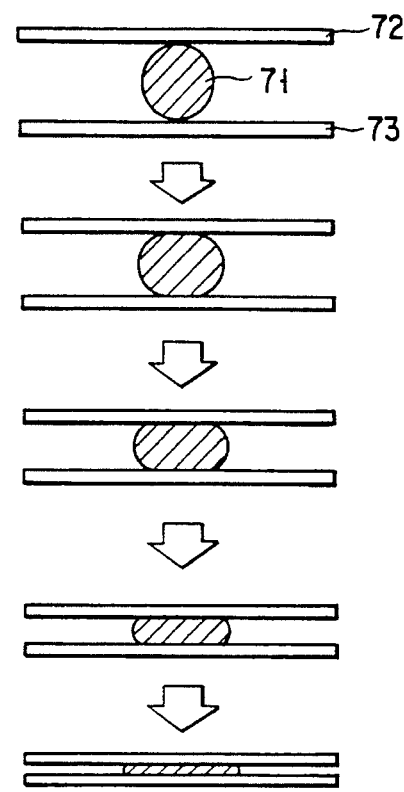
F I G. 37
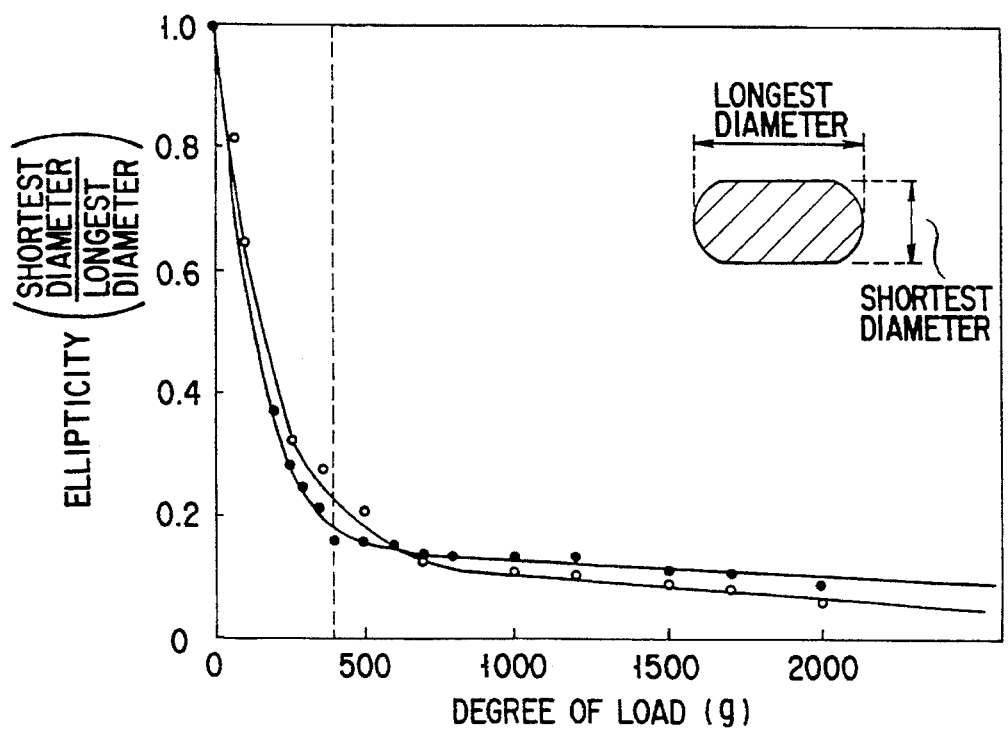
F I G. 38

5,593,517

REGENERATING MATERIAL AND REFRIGERATOR USING THE SAME

BACKGROUND OF THE INVENTION

1. Field of the Invention

The present invention relates to a regenerating material for use in a refrigerator and to a refrigerator using the same.

2. Description of the Related Art

In recent years, superconductive technique has developed remarkably. The application of super-conductive technique has expanded, and the development of a miniaturized high-performance refrigerator has become proportionally important. It is demanded that a refrigerator be light and small, and have a high level of heat efficiency.

Some types of miniaturized refrigerators are known. Among them is a regeneration-type cryogenic refrigerator such as a Gifford-MacMahon (GM)-type refrigerator. A regeneration-type cryogenic refrigerator usually comprises a plurality of regenerators. Each regenerator is filled with a material having high heat-recuperation, namely, a regenerating material. The regenerating material plays an important role in exchanging heat with a coolant gas in a refrigeration cycle. Hence, the higher the recuperation property of the regenerating material, the higher the regeneration efficiency. In other words, the greater specific heat at constant volume and the higher the heat conductivity of the regenerating material, the higher the regeneration efficiency.

Hitherto used as a regenerating material in a regenerator used in a room-temperature side is copper. This is because copper has high specific heat at constant volume and good heat conductivity within a room temperature range. Lead has also been used as a regenerating material in a regenerator used in the lowest-temperature side, since it exhibits high specific heat even at low temperature. However, since the low-temperature specific heat of lead is a lattice specific heat ascribed to lattice vibration, it rapidly decreases in proportion to the cube of temperature (T) at low temperature. Consequently, the regeneration efficiency of the regenerator employing lead as a regenerating material drastically decreases at an extremely low temperature. The lowest temperature attained by the refrigerator employing such a regenerator is limited to at lowest around 10 K.

Under the aforementioned circumstances, Jpn. Pat. Appln. KOKAI Publication No. 1-310269, in which the inventors paid attention to an abnormality of a specific heat accompanying magnetic phase transition and discloses a rare earth magnetic alloy which has low magnetic transition temperature and high specific heat at constant volume at a low temperature.

However, this rare earth magnetic alloy is inevitably lacks in mechanical strengths such as abrasion resistivity and wear resistivity due to the common fragility of rare earth metals. If a refrigerator comprising regenerators charged with such a regenerating material lacking in mechanical strength is driven for a long period of time, the regenerating material becomes worn out and pulverized by the circulation of high-pressure helium gas and the like, and the fine powder generated flows out of the regenerator, damaging a helium-gas seal by adhering to a seal sliding portion. Consequently, the regeneration efficiency is significantly decreased.

SUMMARY OF THE INVENTION

An object of the present invention is to improve the reliability of a refrigerator by preventing a decrease in refrigeration efficiency when the refrigerator is driven for a long period of time by providing a hardly-pulverized regenerating material having excellent mechanical strength such as abrasion resistivity.

Another object is to provide a refrigerator having a high level of reliability and which does not suffer a decrease in refrigeration efficiency when it is driven for a long period of time.

One aspect of the regenerating material according to the present invention is characterized in that it comprises a rare earth alloy containing a main phase and a sub-phase which differ in an amount of a rare earth element, and in that an average diameter of a cross-sectional main phase is 0.01 μm to 20 μm and an average width of a cross-sectional sub-phase is 0.01 μm to 3 μm.

Another aspect of the regenerating material according to the present invention is characterized in that it comprises a rare earth alloy containing a main phase and a sub-phase which differ in an amount of a rare earth element, and which is an aggregate consisting of the main phase and the sub-phase which is present on the surface of the main phase like a skin or an aggregate consisting of a main phase and a fibrous sub-phase present in the main phase.

Further, the refrigerator according to the present invention comprises a coolant gas, a regenerator accommodating the regenerating material according to the present invention, and expanding means for expanding the coolant gas.

The regenerating material according to the present invention has a structure consisting of a main phase formed of an aggregate and a sub-phase present as a skin on the surface of the main phase or present in a fibrous form in the main phase as shown in FIGS. 1 to 3. By virtue of such a structure, the skin-like or fibrous sub-phase functions as a skeleton or a support for the main phase, a hardly-pulverized regenerating material having excellent mechanical strengths such as abrasion resistivity and wear resistivity can be provided. When such a regenerating material is used by being charged in the regenerator of a cryogenic refrigerator, regenerating material can avoid being pulverized, thereby maintaining satisfactory refrigeration efficiency for a long period of time.

Since such a regenerating material is charged in the regenerator provided to the refrigerator of the present invention, even if the refrigerator is driven for a long period of time, it can maintain a satisfactory refrigeration efficiency with no pulverization of the regenerating material.

BRIEF DESCRIPTION OF THE DRAWINGS

FIG. 9 is a cross sectional SEM photograph of an alloy manufactured in Example 1;

FIG. 10 is a cross sectional SEM photograph of an alloy manufactured in Example 2;

FIG. 13 is a cross sectional SEM photograph of an alloy manufactured in Comparative Example 2;

FIG. 14 is a cross sectional SEM photograph of an alloy manufactured in Comparative Example 3;

FIG. 15 is a graph showing specific heat properties of the alloys of Example 1 (indicated by a solid line) and Comparative Example 1 (indicated by a broken line);

FIG. 16 is a graph showing specific heat properties of the alloys of Example 3 (indicated by a solid line) and Comparative Example 3 (indicated by a broken line);

FIG. 17 is a cross sectional SEM photograph of an alloy manufactured in Example 4;

FIG. 18 is a cross sectional SEM photograph of an alloy manufactured in Comparative Example 4;

FIG. 19 is a graph showing specific heat properties of the alloys of Example 4 (indicated by a solid line) and Comparative Example 4 (indicated by a broken line);

FIG. 26 is a cross-sectional SEM photograph of an alloy manufactured in Example 8;

FIG. 27 is an optical photomicrograph showing a cross-sectional view of an alloy manufactured in Example 9;

FIG. 28 is an optical photomicrograph showing a cross-sectional view of an alloy manufactured in Example 10;

FIG. 29 is a cross-sectional SEM photograph of an alloy manufactured in Example 11;

FIG. 30 is a cross-sectional SEM photograph of an alloy manufactured in Example 12;

FIG. 36 is a view explaining, as a model, a method of a withstand-load test of alloy particles;

FIG. 37 is a view explaining, as a model, a method of the withstand-load test of lead particles;

FIG. 38 is a graph showing the relationship between the degree of load provided on lead particles and the flatness of the particles.

DETAILED DESCRIPTION OF THE PREFERRED EMBODIMENTS

In the present invention, a main phase is defined as a dominant phase in a rare earth alloy. The main phase and a sub-phase differ in a content of a rare earth element. It is preferred that the main phase contain the rare earth element in a larger amount than the sub-phase since the main phase has greater influence on the specific heat than the sub-phase.

As the rare earth alloy, an alloy having a composition represented by a formula $RM_z$ ($0.001 \leq Z \leq 13$) can be used. As R, at least one rare earth metal selected from the group consisting of Y, La, Ce, Pr, Nd, Pm, Sm, Eu, Gd, Tb, Dy, Ho, Er, Tm, Yb and Lu may be used. As M, at least one element selected from the group consisting of Fe, Ni, Co, Cu, Ru, Rh, Pd, Ag, Pt, Au, Al, Ga, and In may be used. As the main phase, an intermetallic compound represented by, for example, $RM_{1/3}$, $RM_{1/2}$, $RM_{3/5}$, $RM_{2/3}$, $RM$, $RM_2$, or $RM_5$ are used. The sub-phase possibly comprises a plurality of intermetallic compounds.

Figure 2A:
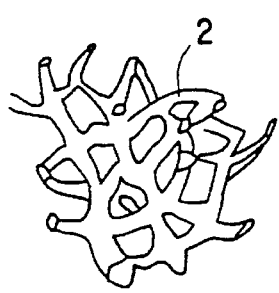
FIG. 2A is a view showing another form of the regenerating material according to the present invention and exhibiting a fibrous sub-phase 2 present in a main phase 1 like a leaf vein.
Figure 2B:
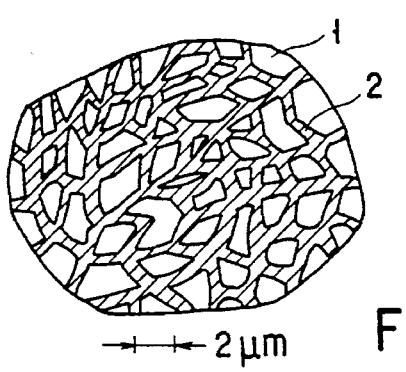
FIG. 2B is a cross-sectional view of the regenerating material consisting of a main phase 1 and the sub-phase 2 having a form shown in FIG. 2A and present in the main phase 1.
Figure 3:
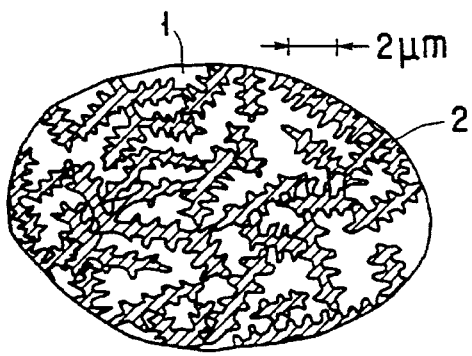
FIG. 3 is a view showing another form of the regenerating material according to the present invention and exhibiting the twig-like sub-phase 2 present in a main phase 1.

The main phase and the sub-phase of the present invention may be present mainly in two forms shown in FIGS. 1 to 3.

Figure 1A:
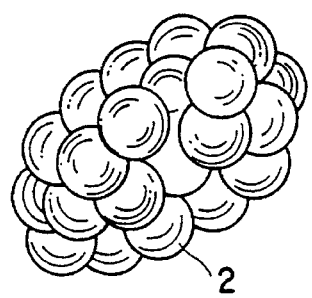
FIG. 1A is a view showing a form of the regenerating material according to the present invention and exhibiting an aggregate of a plurality of particles comprising a granular main phase 1 and a sub-phase 2 present as skin of the main phase.
Figure 1B:
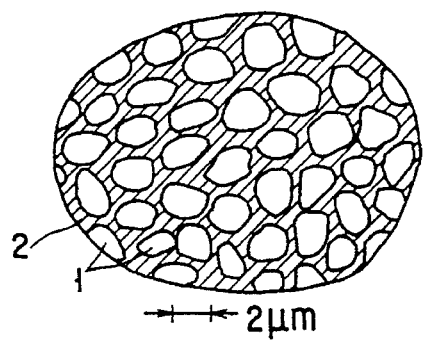
FIG. 1B is a cross-sectional view of the aggregate particles shown in FIG. 1A.

First, a sub-phase is present on the surface of a main phase as a skin of the main phase. More specifically, a sub-phase 2 is present as a skin of a main phase 1 consisting of an aggregate of a plurality of particles as shown in FIGS. 1A and 1B (a sectional view). Second, a sub-phase is present in the form of fiber in a main phase. More specifically, a sub-phase 2 develops into fibrous tissue form like a leaf vein in a main phase 1, as shown in FIGS. 2A and 2B (a sectional view), or a sub-phase 2 develops into a fibrous form like a twig in a main phase 1, as shown in FIG. 3.

In the case where the regenerating material according to the present invention has the structure shown in FIG. 1, it is preferable that the granular main phase 1 have an average diameter of 0.01 to 20 μm and the skin-like sub-phase 2 have an average thickness (average width) of 0.01 to 3 μm. More preferably, the main phase 1 has an average diameter of 0.01 to 10 μm and the skin-like sub-phase 2 has an average thickness (average width) of 0.01 to 1 μm.

In the case where the regenerating material according to the present invention has the structure shown in FIG. 2 or 3, an average diameter of the main phase 1 is preferably 0.01 to 20 μm, more preferably 0.01 to 10 μm and an average fiber width (average width) of the fibrous sub-phase 2 is preferably 0.01 to 3 μm, more preferably 0.01 to 1 μm. These ranges are defined based on the fact that if the average diameter of the main phase is less than 0.01 μm or the average width of the sub-phase is less than 0.01 μm, it is difficult to obtain a main phase containing a fibrous sub-phase. If the average diameter of the main phase exceeds 20 μm or the average width of the sub-phase is more than 3 μm, the mechanical strength of the regenerating material tends to decrease.

Figure 7:
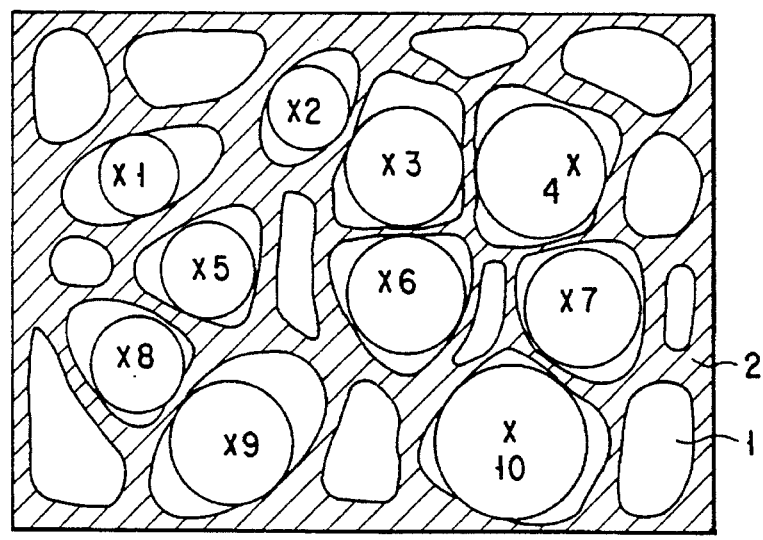
FIG. 7 is a view explaining a calculation method of an average diameter of the main phase used in the present invention and showing circles respectively including arbitrary points of in a main phase 1 and having the largest diameter thereof possible while avoiding any invasion of a sub-phase 2.

The average diameter used herein can be obtained in the following manner. First, a sample of the regenerating material is sliced and the surface of the resulting slice is polished, and a reflected electron image thereof under SEM observation is then photographed. Second, 10 points are arbitrarily set in the area of the main phase 1 as shown in FIG. 7. The largest circle is then drawn so as to include each arbitrarily-set point while avoiding any invasion of the sub-phase (the arbitrarily-set point is not always the center of the circle). An average diameter of 10 circles drawn with respect to the respective arbitrarily-set points is regarded as an average diameter of the main phase 1.

On the other hands, an average distance between fibers of the sub-phase 2, which is determined by the average diameter of the main phase 1 shown in the sectional view of FIG. 2B, is preferred to be 0.01 to 20 μm, more preferably, 0.01 to 10 μm. This preferable range of the average distance between fibers is defined such that the fibrous sub-phase 2 supports a fragile main phase 1 like a skeleton by finely and densely distributing over the main phase.

The main phase and the sub-phase constituting the regenerating material according to the present invention are preferred to present in a ratio range of 50 to 90% by volume, and 10 to 50% by volume, respectively. If the ratio of the sub-phase is less than 10% by volume, the mechanical strength of the regenerating material is difficult to improve.

In the regenerating material represented by the formula $RM_z$ according to the present invention, it is preferable that a Z value of the sub-phase be larger than that of the main phase. This is because with the z value of the formula $RM_z$ becomes smaller, that is, with the concentration of the rare earth element becomes larger, the specific heat per unit volume of the regenerating material becomes better, whereas, the regenerating material conversely becomes fragile. In other words, the less the rare earth element concentrated, the higher the mechanical strength of the regenerating material becomes. Hence, by reducing the concentration of the rare earth element of the sub-phase lower than the main phase, it is possible to form a rigid skin or rigid fibers of the sub-phase, with the result that a regenerating material having much higher mechanical strength can be realized. Similarly, the main phase having the rare earth element in a lower concentration has advantages from the view point of mechanical strength. Among alloys having a composition represented by the formula $RM_z$ ($0.001 \leq Z \leq 13$), an alloy having a Z value in the range of $0.4 \leq Z \leq 13$ is preferable as the main phase.

In addition, with the aim of improving chemical stability or adjusting a magnetic phase transition temperature, an element such as C, Si, Ge, Sn, Pb and Bi can be slightly added, for example, to 10% by atom.

The regenerating material according to the present invention is preferred to be formed of alloy particles having an aspect ratio (a ratio of the major axis to the minor axis) of 5 or less. This is defined based on the fact that if alloy particles have nearly spherical shape and a similar diameters each other as much as possible, a gas flows more smoothly. It is preferable that the 70 wt % or more particles in the entire particles have an aspect ratio of 5 or less and a particle diameter of 1 to 2000 μm, more preferably, 10 to 1000 μm.

If the aspect ratio of the alloy particles not exceeds 5, it becomes easy to accommodate the alloy particles in a regenerator in such a way that voids are present uniformly among the particles. If such particles having an aspect ratio more than 5 are present in an amount exceeding 30% in the entire particles, regeneration property and the like deteriorate. More preferably, the aspect ratio is 3 or less, most preferably, 2 or less. The form of the alloy particles is not particularly restricted, but a spherical form and a round form such as an ellipsoid of revolution are preferable. Most preferably, the form is close to a complete sphere as mush as possible. A ratio of the particles having an aspect ratio of 5 or less to the entire particles is preferably 80 wt % or more, more preferably, 90 wt % or more.

If a diameter of alloy particles is less than 1 μm, the density of charged particles becomes too high, increasing the pressure loss of a working medium such as helium. Conversely, if the diameter of alloy particles is over 2000 μm, the surface area serving for heat-exchanging between a regenerating material and the working medium becomes smaller, with the result that the heat-exchange efficiency decreases. Hence, if such particles present in an amount more than 30 wt % of the entire particles, the regeneration performance decreases. A ratio of particles having a diameter in a range of 1 to 2000 μm to the entire particles is preferably 80 wt % or more, more preferably 90 wt % or more.

On the other hand, the effect of the present invention remarkably appears in the case when the alloy particles have a relatively high aspect ratio. This is because when particles having conventional metal texture has a relatively high aspect ratio, they are likely to break easily since stress is concentrated locally on the particles when outer force is applied thereto. Consequently, from the view point of mechanical strength, alloy particles of fiber form, mesh form, or the like having an aspect ratio more than 5 can be employed as the regenerating material of the present invention.

The regenerating material according to the present invention can be formed by, for example, the following method.

Figure 4:
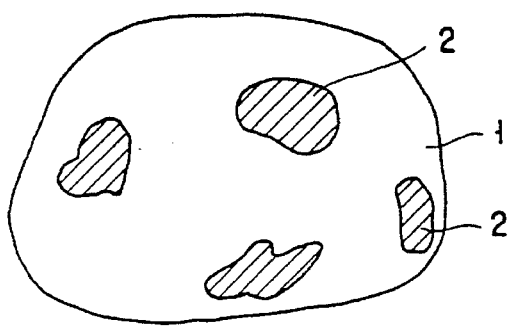
FIG. 4 is a cross-sectional view showing an example of the regenerating material obtained by reducing a quenching speed.
Figure 5:
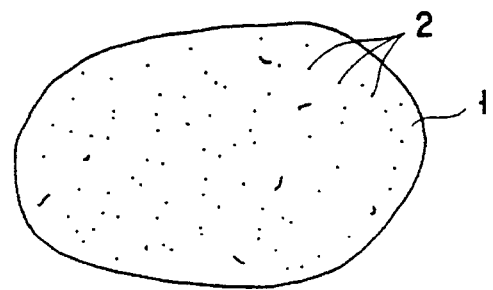
FIG. 5 is a across-sectional view showing an example of the regenerating material obtained by increasing a quenching speed.

A raw material $RM_z$ having a desired ratio of R to M is melt in a crucible to obtain a completely molten raw material, and then, quenched. The ratio of a sub-phase present in the regenerating material can be adjusted, and a texture structure of the regenerating material can be varied by controlling the Z value of starting formula or a quenching rate. To be more specific, a regenerating material having a main phase formed of aggregate particles and a sub-phase present as skin of the main phase (shown in FIG. 1), or a regenerating material having a sub-phase which is grown to a fibrous form or precipitated in fibrous form in the main phase (shown in FIG. 2 or 3), can be formed. In the case where a quenching rate at the time of the quenching mentioned-above is slow, the sub-phase 2 is present in the form of relatively large particles in the main phase 1, as shown in FIG. 4. On the contrary, in the case where the quenching rate is extremely high, the sub-phase 2 is uniformly present in the form of fine particles in the main phase 1. In both cases, the sub-phase 2 does not function as a support or a skeleton for the main phase, with the result that regenerating material having high mechanical strength is difficult to obtain.

The method for quenching the molten metal mentioned above is not particularly restricted. various quenching methods can be applied thereto. The molten metal can be quenched to solidify by means of the high frequency melting, quenching by the plasma-arc melting, the gas-atomize method, the plasma-spray method, the centrifugal atomizer method such as the rotating disk process and the rotating electrode process, or the rapid cooling with a single or double roll and a vacuum.

The quenching rate can be controlled by choosing an appropriate type of ambient gas, ambient pressure, a size of alloy particles to be solidified, or quality of a material to be contact when alloy particles are solidified, taking heat conductivity, wetting characteristics to the alloy particles, and the like into consideration.

The refrigerator according to the present invention is characterized by comprising a coolant gas, a regenerator containing the regenerating material according to the present invention, and expansion means for expanding the coolant gas.

Hereinafter, a gas circulation of the refrigerator according to the present invention will be explained with reference to FIGS. 6A to 6C.

Figure 6:
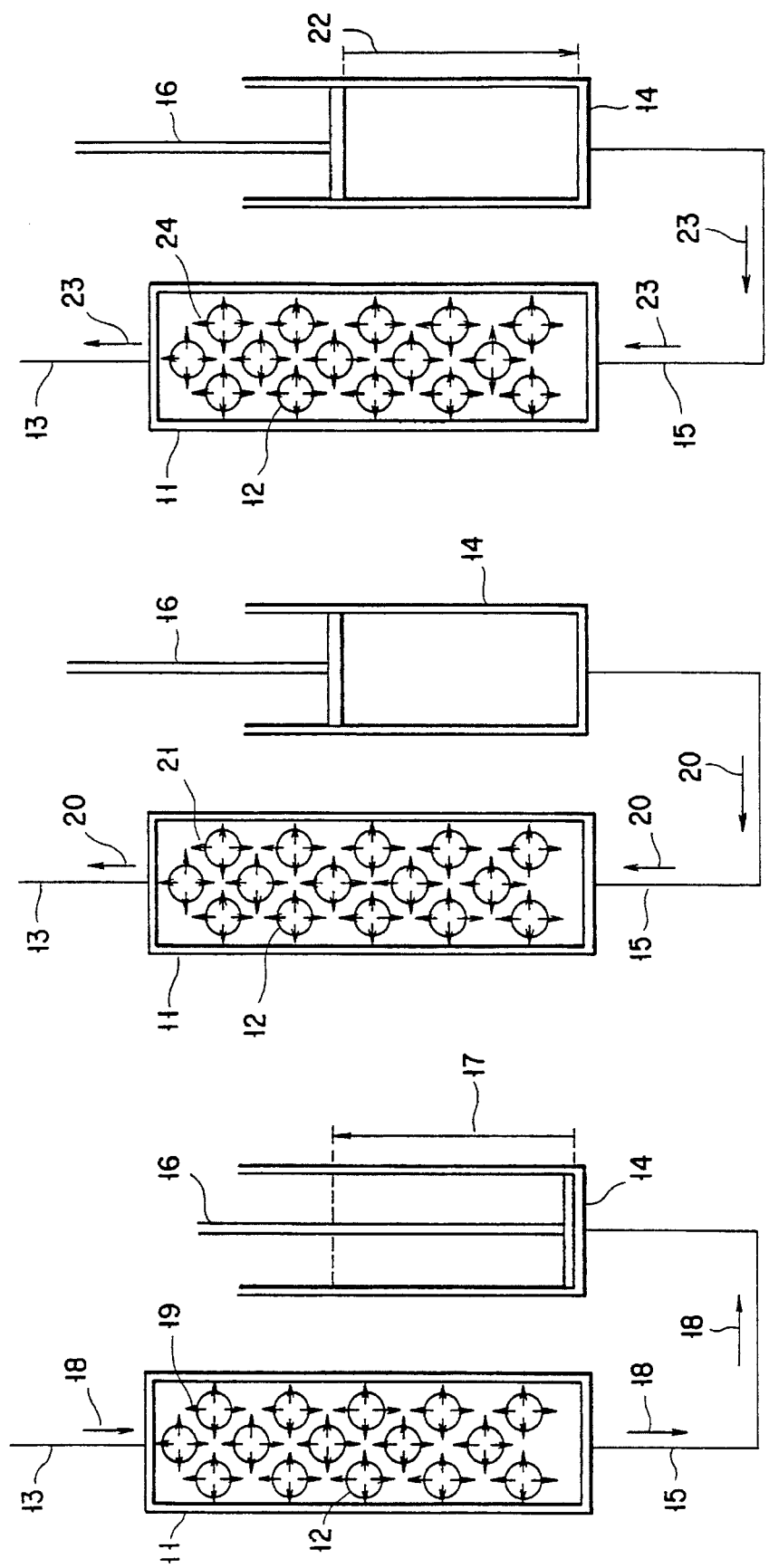
FIG. 6A is a schematic view to explain a gas circulation of the refrigerator provided with a regenerator charged with the regenerating material of the present invention and a view explaining a process of introducing high-pressure gas as a working medium in the direction of an arrow 18.
FIG. 6B is a schematic view to explain a gas circulation of the refrigerator provided with a regenerator charged with the regenerating material of the present invention and a view explaining a process of sucking high-pressure gas in the direction of an arrow 20.
FIG. 6C is a schematic view to explain a gas circulation of the refrigerator provided with a regenerator charged with the regenerating material of the present invention and a view explaining a process of expelling low-temperature and low-pressure gas in the direction of an arrow 22.

In FIGS. 6A to 6C, in a regenerator 11, the aforementioned regenerating material 12 is charged. One end of the regenerator 11 is connected to a source of a working medium (not shown) via a pipe 13. The other end of the regenerator 11 is connected to an expansion cylinder 14 via a pipe 15. A slidable piston 16 is placed in the expansion cylinder 14. With the movement of the piston 16, the inner volume of the cylinder 14 changes. As the coolant gas used in the refrigerator according to the present invention, for example, a helium gas, a nitrogen gas, a flon gas (fluorocarbon gas) may be used.

The regenerator 11 is cooled in the following refrigerating cycle consisting of four processes (a) to (d).

In a process (a) shown in FIG. 6A, the piston 16 moves in the direction of an arrow 17. With this movement, the inner volume of the expansion cylinder 14 increases, at the same time, high pressure gas is introduced in the direction of an arrow 18 from the working medium source. While the high pressure gas is passing through the regenerator 11 before reaching the expansion cylinder 14, the high pressure gas is refrigerated by the regenerating material 12. The refrigerated high pressure gas is pooled in the expansion cylinder 14. An arrow 19 indicates the direction of heat being transferred from the high pressure gas to the regenerating material 12 in the regenerator 11.

In a process (b) shown in FIG. 6B, gas is partly expelled in the direction of an arrow 20 from the expansion cylinder 14 by sucking the gas in the direction of the arrow 20 by sucking means (not shown) connected to the pipe 13. During the suction, the inner volume of the cylinder 14 is maintained the same level as that before the suction. As a result, a gas remaining in the cylinder 14 expands, reducing the temperature of the gas present in the expansion cylinder 14. The gas released from the cylinder 14 is supplied to the regenerator 11 through the pipe 15. The released gas, while it is passing through the regenerator 11, deprives heat from the regenerating material 12. An arrow 21 indicates the direction of heat being transferred from the regenerating material 12 in the regenerator 11 to the gas.

In a process (c) shown in FIG. 6C, when the piston 16 moves in the direction of an arrow 22, a low-temperature and low pressure gas is released in the direction of an arrow 23 from the expansion cylinder 14 to the regenerator 11 through the pipe 15. The gas, while passing through the regenerator 11, deprives heat from the regenerating material 12. In other words, the gas cooled the regenerating material 12. An arrow 24 indicates the direction of heat movement from the regenerating material 12 in the regenerator 11 to the gas.

In the process (d), the operation is again brought back to the process (a).

Hereinbelow, the refrigerator provided with the regenerator charged with the regenerating material according to the present invention will be explained with reference to drawings.

Figure 39:
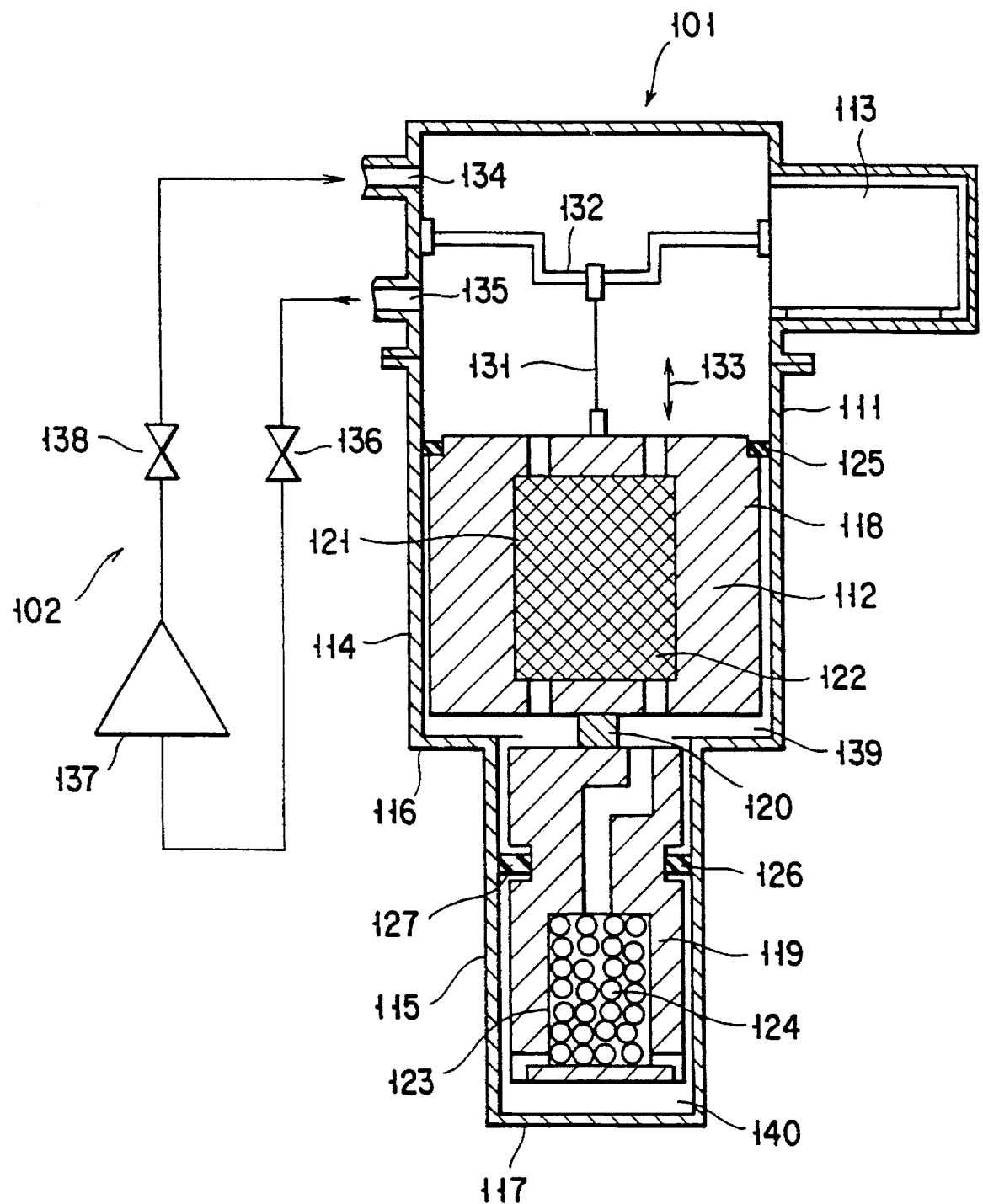
FIG. 39 is a schematic view of the structure of an embodiment of the cryogenic refrigerator according to the present invention.

FIG. 39 shows a refrigerator classified in a Gifford-MacMahon type, by way of example of a regeneration-type cryogenic refrigerator according to the present invention. This refrigerator comprises mainly a cold head 101 and a coolant gas supply-exhaust system 102.

The cold head 101 is constituted by a closed cylinder 111, a reciprocating piston, namely, a displacer 112 formed of a heat-insulating material accommodated in the cylinder 111, and a motor 113 providing a driving force to reciprocal movement of the displacer 112.

The cylinder 111 is constituted by a first cylinder 114 having a larger diameter and a second cylinder 115 having a smaller diameter which is coaxially connected to each other. The first cylinder 114 and the second cylinder 115 are generally formed of a thin stainless steel plate and the like. The first refrigeration stage 116 is set at a portion of a boundary wall between the first cylinder 114 and the second cylinder 115. The second refrigeration stage 117 in which temperature is lowered than that of the first refrigeration stage 116, is set at the bottom wall of the second cylinder 115.

The displacer 112 is constituted by a first displacer 118 reciprocating in the first cylinder 114 and a second displacer 119 reciprocating in the second cylinder 115. The first displacer 118 and the second displacer 119 is axially connected to each other by a connecting mechanism 120.

In the first displacer 118, a fluid channel 121 partly constituting a regenerator is axially formed. In the fluid channel 121, a regenerating material 122 formed of copper mesh or the like is accommodated.

In the second displacer 119, a fluid channel 123 partly constituting a regenerator used in a final regeneration step is axially formed. In the fluid channel 123, the regenerating material 124 according to the present invention being formed into a plurality of spheres or fibers is accommodated.

Between the outer peripheral surface of the first displacer 118 and the inner peripheral surface of the first cylinder 114, and between the outer peripheral surface of the second displacer 119 and the inner peripheral surface of the second cylinder 115, sealing devices 125 and 126 are respectively interposed.

The top end of the first displacer 118 shown in FIG. 39 is connected to a rotation axis of the motor 113 via a connecting rod 131, a scorchyork or a crank axis 132. When the motor 113 rotates, in synchronism with this rotation, the displacer 112 moves reciprocally in the direction of a solid arrow 133 shown in the FIG. 39.

On the top portion of a side wall of the first cylinder 114, an inlet 134 and an outlet 135 for a coolant gas are provided. The inlet 134 and the outlet 135 are connected to the coolant gas supply-exhaust system 102.

The coolant gas supply-exhaust system 102 is a partly constituting a helium gas circulation system via the cylinder 111. In this system 102, the outlet 135 is connected to the inlet 134 via a low pressure valve 136, a compressor 137, and a high pressure valve 138. The coolant gas supply-exhaust system 102 is used for sending a helium gas having a low pressure of approximately 5 atm into the cylinder 111 while being compressed to a high pressure of approximately 18 atm by means of the compressor 137. The opening and closing of the low pressure valve 136 and the high pressure valve 138 is controlled in association with a reciprocal movement of the displacer 112 as described later.

Hereinbelow, the operation of the refrigerator having the above constitution will be explained.

In the refrigerator, a portion to be cooled, i.e., a portion to perform refrigeration is the first refrigeration stage 116 and the second refrigeration stage 117.

When a motor 113 starts rotation, the displacer 112 reciprocates between a bottom dead center and a top dead center. When the displacer 112 is at the bottom dead center, the high pressure valve 138 opens and the high-pressure helium gas flows into the cold head 101. Subsequently, the displacer 112 moves to the top dead center. As described above, since the sealing devices 125 and 126 interposed between the outer peripheral surface of the first displacer 118 and the inner peripheral surface of the first cylinder 114, and between the outer peripheral surface of the second displace 119 and the inner peripheral surface of the second cylinder 115, respectively, when the displacer 112 moves toward the top dead center, the high pressure helium gas flows passing through the fluid channel 121 formed in the first displacer 118 and the fluid channel 123 formed in the second displacer 119, into a first expansion chamber 139 formed between the first displacer 118 and the second displacer 119 and a second expansion chamber 140 formed between the second displacer 119 and the bottom wall of the second cylinder 115, respectively. With this flow, the high pressure helium gas is refrigerated by the regenerating materials 122 and 124. Finally, the high pressure helium gas flown into the first expansion chamber 139 is refrigerated to a level of a temperature of 30 K. and the high pressure helium gas flown into the second expansion chamber 140 to a level of 4 K.

Thereafter, the high pressure valve 138 closes and the low pressure valve 136 opens. When the low pressure valve 136 opens, the high pressure helium gas in the first expansion chamber 139 and the second expansion chamber 140 is expanded to degrade a temperature thereof and heat is absorbed in the first refrigeration stage 116 and the second refrigeration stage 117. Then, the displacer 112 moves to the bottom dead center again, the helium gas is expelled from the first expansion chamber 139 and in the second expansion chamber 140 with this movement of the displacer 112. The expanded helium gas refrigerates the regenerating materials 122 and 124 while passing through the fluid channels 121 and 123, returns to room temperature, and is exhausted. Subsequently, refrigeration operation is effected by repeating the aforementioned cycle.

In the aforementioned example, a refrigerator comprising the two stages is generally described. However, a refrigerator comprising three stages or more, for example, high temperature, middle temperature and low temperature stages can be applied to the present invention.

Further, the case is shown in which the present invention is applied to the Gifford-MacMahon type refrigerator in the aforementioned example. However, the present invention can be applied to a general regeneration-type cryogenic refrigerator including a Stirling refrigerator, an improved solvay-cycle GM refrigerator, a Bilmya refrigerator. It is possible to employ regeneration materials of various forms such as spherical form, fiber form, and mesh form regenerating material.

Hereinbelow, preferred embodiments will be explained with reference to drawings.

Figure 8:
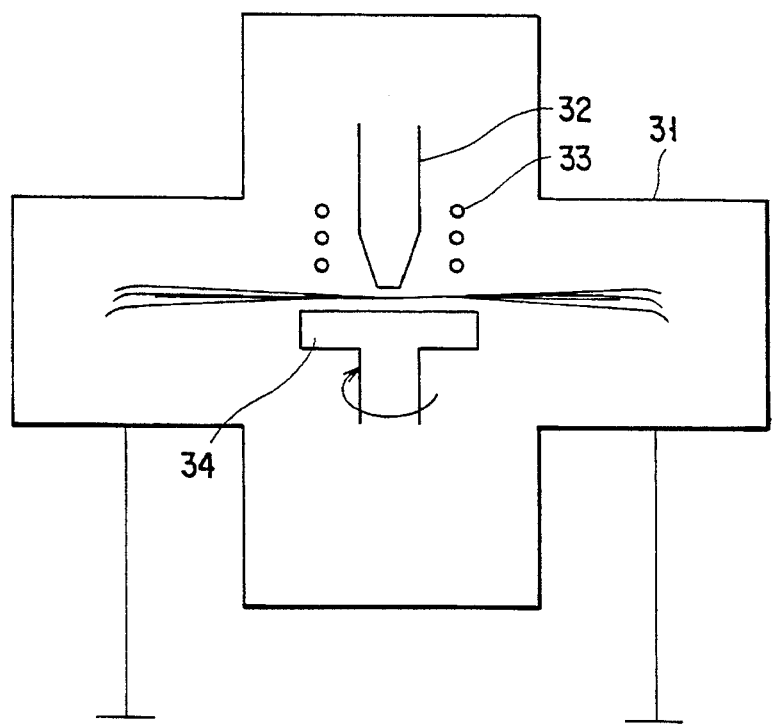
FIG. 8 is a schematic view of a particle manufacturing apparatus based on the centrifugal atomization using rotating disk process and used in manufacturing granular alloy particles in Examples of the present invention.
Figure 11:
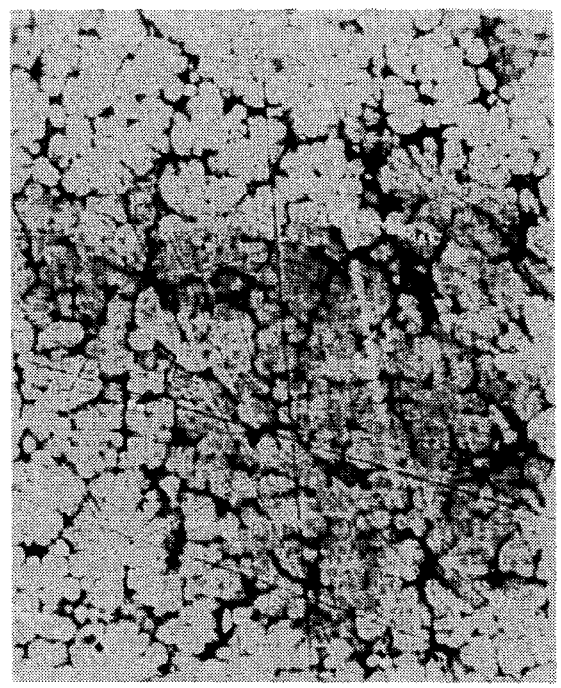
FIG. 11 is a cross sectional SEM photograph of an alloy manufactured in Example 3.

FIG. 8 is a schematic view showing a particle manufacturing apparatus based on the centrifugal atomization and used in Examples of the present invention. In a chamber 31, a quartz tube crucible 32 with a nozzle having, for example, 70 mm in a diameter, into which pressurized agron gas is supplied, is placed in a standing form. A high frequency coil 33 is placed around the periphery of the quartz tube crucible 32 in the chamber 31. A rotating disk 34 formed of stainless steel (SUS 304), which is rotated by a motor (not shown), is arranged right under the nozzle of the quartz tube crucible 32.

EXAMPLE 1

First, a composition comprising Er in an amount of 73% by atom and Ni in balance was prepared from Er and Ni with 99.9% in purity. A mother alloy was prepared by the high frequency melting. The mother alloy was then pulverized and placed in the quartz tube crucible 32 of a centrifugal atomizing apparatus shown in FIG. 8. After an argon gas atmosphere at approximately 600 torr was attained in the chamber 31, the alloy powder in the quartz tube crucible 32 was melted by the induction heating by the high frequency coil 33. Subsequently, argon gas was supplied to the quartz tube crucible 32 at a pressure of 0.3 kg/cm$^2$ and the molten alloy (temperature: approximately 1000°C.) in the quartz tube crucible 32 was ejected from the nozzle at the bottom end of the quartz-tube crucible 32 onto the rotating disk 34 while rotating at a high speed of 6×10$^3$ rpm. The molten alloy was scattered in droplet form in the chamber 31 and cooled, thereby manufacturing spherical alloy particles.

The structure of the thus-obtained alloy particles was checked by an SEM photograph thereof. As a result, the alloy particles had a form in which a skin-like sub-phase covered over a main phase having an average diameter of 2.2 μm as shown in FIG. 9. The average thickness of the sub-phase was approximately 0.5 μm. This average thickness was obtained by calculating the average of the thickness measured with respect to 10 points arbitrarily selected from the sub-phase of the SEM photograph (reflected electron image) of FIG. 9.

Compositions of the main phase and the sub-phase of the alloy particles, and a sub-phase content in the alloy particle obtained in Example 1 were analyzed by an electron probe microanalysis (EPMA) method. As a result, it was found that the main phase and the sub-phase were formed of $ErNi_{1/3}$ and $ErNi_{3/5}$, respectively and the sub-phase content was 20% by volume.

EXAMPLES 2 AND 3

First, a composition comprising Er in an amount of 73% by atom and Co in balance (Example 2) and a composition comprising Nd in an amount of 71% by atom and Ni in balance were prepared from Er, Nd, Ni, and Co with 99.9% in purity. Mother alloys were prepared by the high frequency melting and then pulverized. These pulverized mother alloys were atomized by centrifugal atomization using the a centrifugal atomizing apparatus shown in FIG. 8 in the same manner as in Example 1, thereby manufacturing two types of spherical alloy particles.

The structures of alloy particles obtained in Examples 2 and 3 were analyzed using SEM photographs of the individual alloy particles. As a result, in both alloy particles of Examples 2 and 3, the sub-phase is developed into fibrous-network form like a leaf vein and distributed over the main phase. The average diameter of the main phase and the average fiber width of the sub-phase of the alloy particles of Examples 2 and 3 were measured in the same manner as in Example 1. As a result, the average diameters of the main phases of Examples 2 and 3 were approximately 2.6 μm and 3 μm, respectively and the average fiber width of the sub-phase were approximately 0.2 μm and 0.5 μm, respectively.

The compositions of the main phase and the sub-phase and a sub-phase content of the alloy particles were determined with respect to alloy particles of Example 2 and 3 using the EPMA method. As a result, the main phase and the sub-phase of the alloy obtained in Example 2 were formed of $ErCo_{1/3}$ and $ErCo_{7/12}$, respectively and the sub-phase content was approximately 25% by volume. The main phase and the sub-phase of the alloy obtained in Example 3 were formed of $NdNi_{1/3}$ and $NdNi_{3/5}$, respectively and the sub-phase content was approximately 15% by volume.

Comparative Examples 1 to 3

First, a composition comprising Er in an amount of 73% by atom and Ni in balance (Comparative Example 1), a composition comprising Er in an amount of 73% by atom and Co in balance (Comparative Example 2), and a composition comprising Nd in an amount of 71% by atom and Ni in balance (Comparative Example 3) were respectively prepared using Er, Nd, Ni, and Co with 99.9% in purity. Three types of alloy particles were prepared by melting by means of an argon-plasma furnace, followed by quenching.

Figure 12:
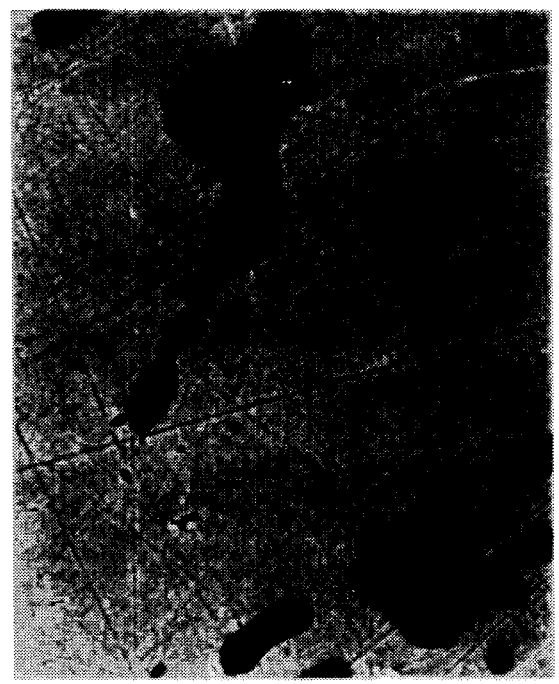
FIG. 12 is a cross sectional SEM photograph of an alloy manufactured in Comparative Example 1.

The structures of the alloy particles obtained in Comparative Examples 1 to 3 were analyzed using SEM photographs thereof. As a result, in any one of the alloy particles of Comparative Examples 1 to 3, the sub-phase was present in the form of relatively large particles in the main phase as shown in FIGS. 12, 13, and 14. The average diameters of the sub-phases of the alloy particles obtained in Comparative Examples 1, 2, and 3 were approximately 10 μm, 5 μm, and 8 μm, respectively.

The compositions of the main phase and the sub-phase, and a sub-phase content of the alloy particles were determined with respect to alloy particles of Comparative Examples 1 to 3 using the EPMA analysis. As a result, the main phase and the sub-phase of the alloy obtained in Comparative Example 1 were formed of $ErNi_{1/3}$ and $ErNi_{3/5}$, respectively and the sub-phase content was approximately 5% by volume. The main phase and the sub-phase of the alloy obtained in Comparative Example 2 were formed of $ErCo_{1/3}$ and $ErCo_{7/12}$, respectively and the sub-phase content was approximately 5% by volume. The main phase and the sub-phase of the alloy obtained in Comparative Example 3 were formed of $NdNi_{1/3}$ and $NdNi_{3/5}$, respectively and the sub-phase content was approximately 3% by volume.

Further, specific heat of alloys obtained in Examples 1 and 3, and Comparative Examples 1 and 3 were measured in a range of extremely low temperatures. The specific heat of alloys of Examples 1 and Comparative Example 1 are shown in FIG. 15 and the specific heat of alloys of Comparative Examples 1 and 3 are shown in FIG. 16.

As is apparent from FIG. 15, compared to the alloy of Comparative Example 1, the alloy of Example 1 has higher specific heat in the wide temperature range over a point of a specific heat peak. As shown in FIG. 16, while a sharp peak is seen in the case of Comparative Example 3, the alloy of Example 3 has a broader peak over a wide temperature range.

Further, alloy particles (regenerating material) of Examples 1 and 2, and Comparative Examples 1 and 2 were respectively charged in a regenerator of a final refrigeration stage of the two-stage type GM refrigerator shown in FIG. 39. The refrigerator was driven with a gas circulation condition in which a helium gas as a coolant gas was sent to the regenerator at a high pressure of 20 atm and sent out from the regenerator at a low pressure of 8 atm, and the refrigeration efficiency was measured. In a refrigerator carrying out the first refrigeration stage, copper mesh was charged. As a result, in a refrigerator having a regenerator charged with alloy particles of Comparative Examples 1 and 2 and carrying out the final refrigeration stage, the regeneration efficiency gradually decreases with driving time. The cause of the decrease was investigated after the refrigerator was driven for approximately 500 hours. It was confirmed that fine powder was generated from the alloy particles of Comparative Examples 1 and 2 by abrasion and adhered onto a sliding seal portion of the refrigerator. The adhesion of fine powder induces leakage of the helium gas. Hence, the decrease of refrigeration efficiency is presumably caused by the leakage of the helium gas occurred in the seal portion. In contrast, the refrigerator provided with the regenerator carrying out the final refrigeration stage and charged with alloy particles of Examples 1 and 2, it was confirmed that no pulverization of alloy particles occurred even after driving for 1000 hours and the refrigerator maintained a good refrigeration efficiency.

EXAMPLE 4

First, a composition comprising Er in an amount of 49% by atom and Ni in balance was prepared from Er and Ni with 99.9% in purity. A mother alloy was prepared by the high frequency melting. The mother alloy was then pulverized and placed in the quartz tube crucible 32 of the centrifugal atomizing apparatus shown in FIG. 8. After an argon gas atmosphere at approximately 500 torr was attained in the chamber 31, the alloy powder in the quartz tube crucible 32 was melted by the induction heating by means of the high frequency coil 33. Subsequently, the argon gas was supplied to the quartz tube crucible 32 at a pressure of 0.3 kg/cm² and the molten alloy (temperature: approximately 1200°C.) in the quartz tube crucible 32 was eject from the nozzle at the bottom end of the quarts-tube crucible 32 onto the rotating disk 34 while rotating at a high speed of 4×10³ rpm. The molten alloy was thus scattered in droplet form in the chamber 31, thereby manufacturing spherical alloy particles.

Comparative Example 4

First, a composition comprising Er in an amount of 50% by atom and Ni in balance was prepared from Er and Ni with 99.9% in purity. An alloy was prepared by melting by means of the argon-plasma furnace and quenching.

The structures of alloys obtained in Example 4 and Comparative Example 4 were checked using SEM photographs thereof. As a result in the alloy of Example 4, the sub-phase was reticulately distributed like a twig over the main phase as shown in FIG. 17. An average diameter of the main phase was approximately 6 μm and the average fiber width of the sub-phase was approximately 1.5 μm. In the alloy of the Comparative Example 4, the sub-phase as a relative large phase was present in the main phase as shown in FIG. 18 and an average width of the sub-phase was approximately 5 μm.

The compositions of the main phase and the sub-phase, and a sub-phase content of the alloys were determined with respect to alloys of Example 4 and Comparative Example 4 using the EPMA analysis. As a result, the main phases and the sub-phases of alloys obtained in both Examples were formed of ErNi and ErNi₂, respectively and the sub-phase content was approximately 10% by volume.

Specific heat in an extremely low temperature range was measured with respect to alloys of Example 4 and Comparative Example 4. The results are shown in FIG. 19. As is apparent from FIG. 19, the peak of the alloy of Example 4 is slightly rounder than that of Comparative Example 4 and has the same peak point (approximately 10 K.) as that in Comparative Example 4. The result exhibits that the alloy of Example 4 has a satisfactory high specific heat characteristics as a regenerating material.

The alloy particles (regenerating material of Example 4 were charged in a regenerator carrying out the second stage of the two-stage type GM refrigerator. The refrigeration efficiency was measured in the same condition as in Example 1. As a result, it was confirmed that no pulverized powder was observed even after the refrigerator was driven for 5000 hour and a satisfactory refrigeration efficiency was maintained.

EXAMPLE 5

First, a composition comprising Er in an amount of 33% by atom and Ni in balance was prepared from Er and Ni with 99.9% in purity. A mother alloy was prepared by the high frequency melting. The mother alloy was then pulverized and placed in the quartz tube crucible 32 of the centrifugal atomizing apparatus shown in FIG. 8. After an argon gas atmosphere at approximately 600 torr was attained in the chamber 31, the alloy powder in the quartz tube crucible 32 was melted by the induction heating by means of the high frequency coil 33. Subsequently, the argon gas was supplied to the quartz tube crucible 32 at a pressure of 0.3 kg/cm² and the molten alloy (temperature: approximately 1250°C.) in the quartz tube crucible 32 was ejected from the nozzle at the bottom end of the quarts-tube crucible 32 onto the rotating disk 34 made of carbon which rotate at a high speed of 6×10³ rpm. The molten alloy was scattered in droplet form in the chamber 31, thereby manufacturing spherical alloy particles.

Comparative Example 5

First, a composition comprising Er in an amount of 34% by atom and Ni in balance was prepared from Er and Ni with 99.9% in purity. An alloy was prepared by melting by means of the argon-plasma furnace and quenching.

Figure 20:
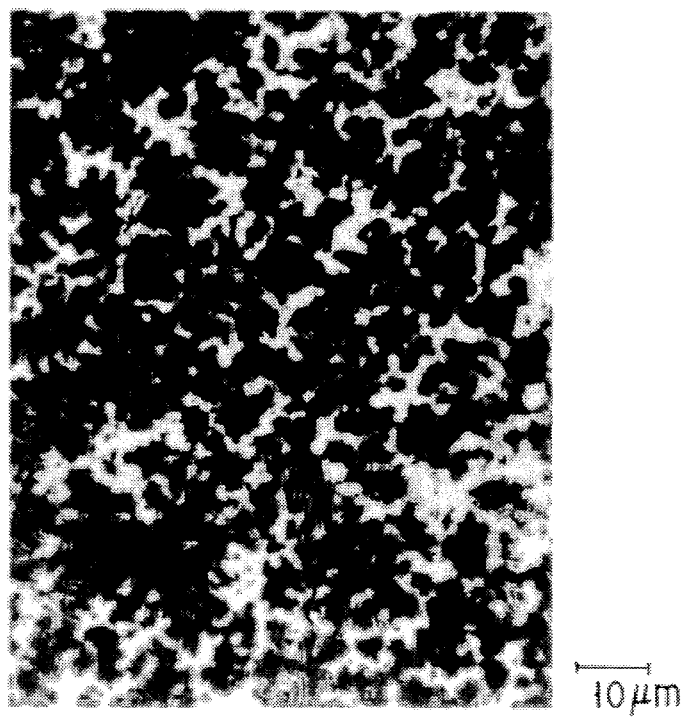
FIG. 20 is a cross sectional SEM photograph of alloy manufactured in Example 5.
Figure 21:
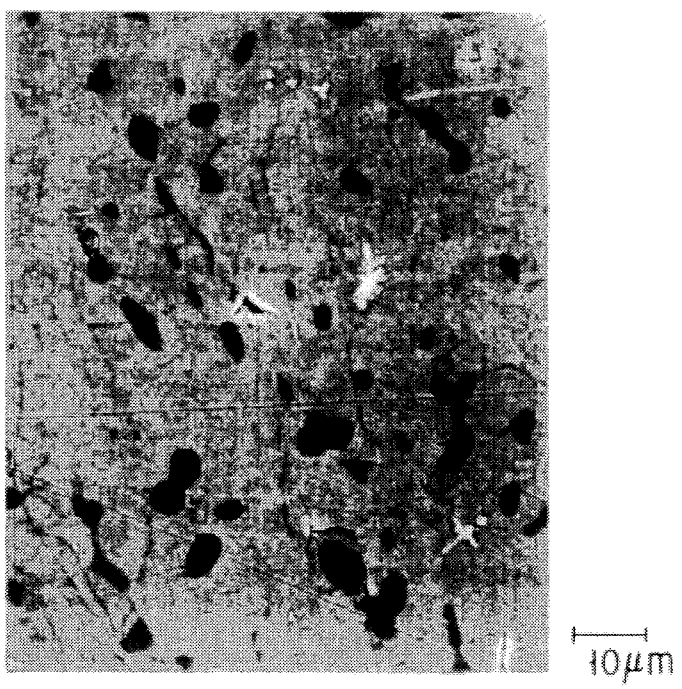
FIG. 21 is a cross sectional SEM photograph of alloy manufactured in Comparative Example 5.

The structures of alloys obtained in Example 5 and Comparative Example 5 were checked using SEM photographs thereof. As a result, in the alloy of Example 5, the sub-phase is reticulately distributed like a leaf vein over the main phase as shown in FIG. 20. An average diameter of the main phase was approximately 3 μm and the average fiber width of the sub-phase was approximately 2 μm. In the alloy of the Comparative Example 5, the sub-phase as relative large particles was present in the main phase as shown in FIG. 21 and an average particle diameter of the sub-phase was approximately 4 μm.

The compositions of the main phase and the sub-phase, and a sub-phase content of the alloy were determined with respect to alloys of Example 5 and Comparative Example 5 using the EPMA method. As a result, the main phases and the sub-phases of the alloys were both formed of ErNi₂ and ErNi₁, respectively and the sub-phase content of Example 5 was approximately 20%. In contrast, the sub-phase content of Comparative Example 5 was less than 2%.

The alloy particles (regenerating material) of Example 5 were charged in a regenerator carrying out in the second stage of the two-stage type GM refrigerator. The refrigeration efficiency was measured in the same condition as in Example 1. As a result, it was confirmed that no pulverized powder was observed even after the refrigerator was driven for 5000 hours and a satisfactory refrigeration efficiency was maintained.

EXAMPLES 6 TO 8 AND COMPARATIVE EXAMPLES 6 TO 10

First, a composition comprising Er in an amount of 73% by atom and Ni in balance (Examples 6 and 7, and Comparative Examples 6 and 7), a composition comprising Er in an amount of 72.5% by atom and Ni in balance (Example 8), a composition comprising Er in an amount of 75% by atom and Ni in balance (Comparative Example 8), a composition comprising Er in an amount of 78% by atom and Ni in balance (Comparative Example 9), and a composition comprising Er in an amount of 50% by atom and Ni in balance (Comparative Example 10) were respectively prepared using Er and Ni of 99.9% in purity. Mother alloys were prepared by high frequency melting and pulverized. The obtained alloy powder was charged in the quartz tube (or BN) crucible 32 of the centrifugal atomizing apparatus shown in FIG. 8, in the same manner as in Example 1. Thereafter, argon (or helium) gas was introduced into the chamber 31 and the pressure thereof was set to constant. The alloy powder in the quartz tube crucible 32 was melted by the induction heating by means of the high frequency coil 33. Subsequently, the pressurized argon (or helium) gas was supplied to the quartz tube crucible 32 and the molten alloy in the quartz tube crucible 32 was ejected from the nozzle at the bottom end of the quarts tube crucible 32 onto the rotating disk 34 made of carbon which rotate at a high speed. The molten alloy was scattered in droplet form in the chamber 31, thereby manufacturing spherical alloy particles of Examples 6 and 8 and Comparative Examples 6 to 10.

EXAMPLE 9

First, a composition comprising Er in an amount of 75% by atom and Ni in balance was prepared from Er and Ni with 99.9% in purity and manufactured a mother alloy thereof. From the mother alloy, spherical alloy particles were then manufactured by means of the gas atomize method.

Figure 22:
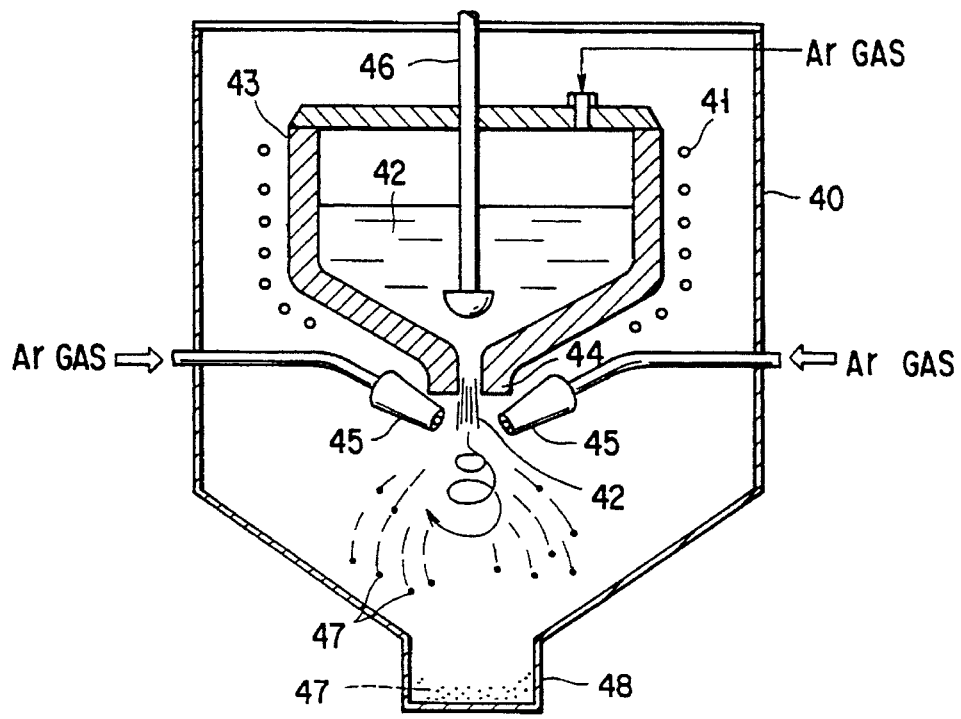
FIG. 22 is a view showing a model of manufacturing of alloy particles by means of the gas-atomization method employed in the Examples of the present invention.

FIG. 22 is a schematic view showing a manufacturing apparatus of the alloy particles by means of the gas atomization method used in the present invention. The apparatus comprises, in a chamber 40, a furnace 43 for preparing a molten metal 42 by heat-melting the raw material metal with a heater 41, a pouring nozzle 44 having an inner diameter of about 2 mm formed at the bottom of the furnace 43, and a plurality of inert gas nozzles 45 for blowing an inert gas for cooling, such as an argon gas, provided near the bottom opening of the pouring nozzle 44 so as to oppose each other, and a valve 46 for controlling opening and shutting of the pouring nozzle 44. In this apparatus, the surface of the molten metal 42 prepared in the furnace 43 is pressurized by high-pressure Ar gas supplied into the furnace and the molten metal 42 is ejected from the opening end of the pouring nozzle 44. At this moment, the inert gas such as Ar gas is blown at high speed in a direction crossing at a right angle to the ejection direction of the molten metal. Consequently, the molten metal 42 was dispersed in the form of mist by the inert gas. The mist-state molten metal, while flowing down with the inert gas circulation stream, is quenched to solidify, thereby collecting spherical-, a cocoon-, or oval-shaped particles 47 in a particle recovering container 48.

EXAMPLES 10 TO 12

First, a composition comprising Er in an amount of 73% by atom and Ni in balance (Example 10), a composition comprising Er in an amount of 75% by atom and Ni in balance (Example 11) and a composition comprising Er in an amount of 51% by atom and Ni in balance (Example 12) were prepared from Er and Ni with 99.9% in purity. Mother alloys thereof were prepared and processed into an electrode-rod shape by machine. Subsequently, spherical alloy particles of Examples 10 to 12 were respectively manufactured by mean of the rotating electrode process method (REP).

Figure 23:
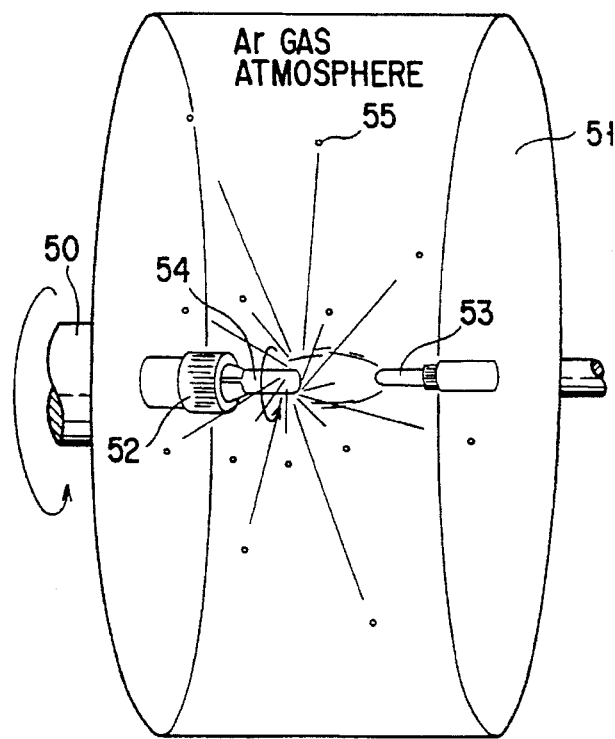
FIG. 23 is a view showing a model of manufacturing alloy particles by means of the rotating electrode process method employed in the Examples of the present invention.
Figure 24:
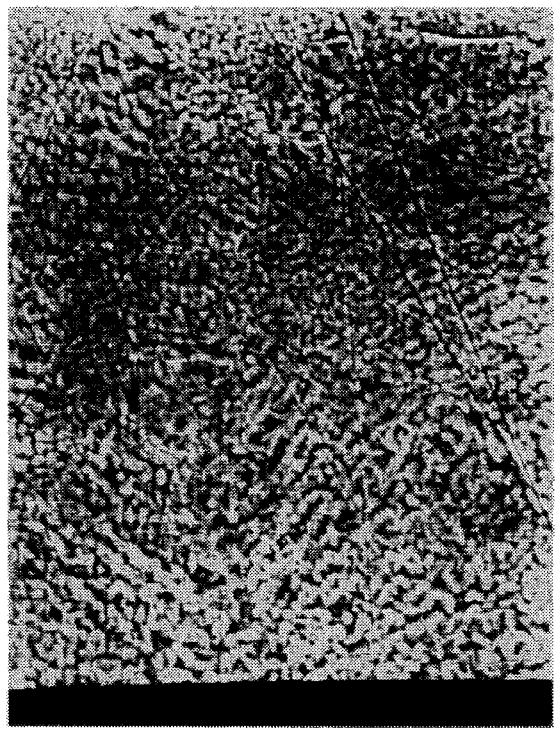
FIG. 24 is a cross-sectional SEM photograph of an alloy manufactured in Example 6.
Figure 25:
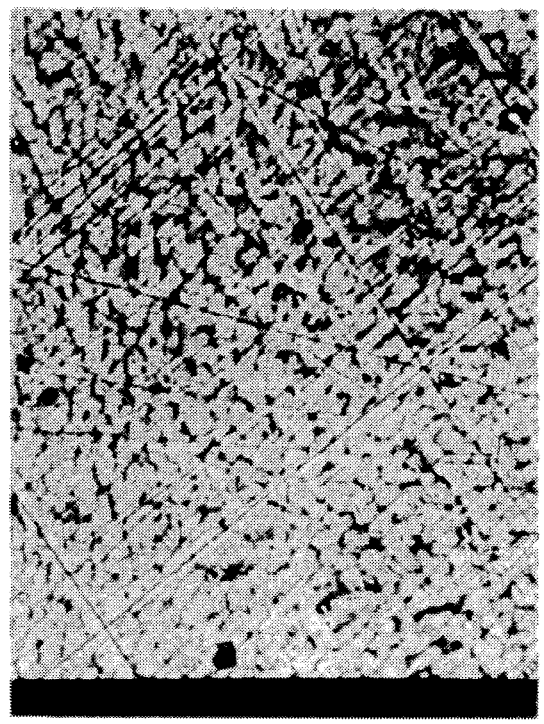
FIG. 25 is a cross-sectional SEM photograph of an alloy manufactured in Example 7.
Figure 31:
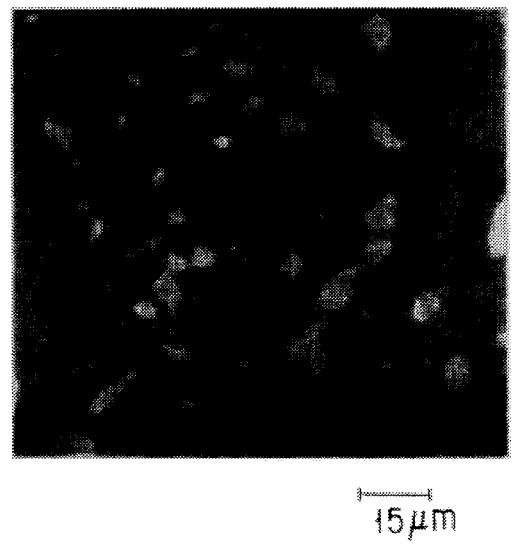
FIG. 31 is an optical photomicrograph of an alloy manufactured in Comparative Example 6.
Figure 32:
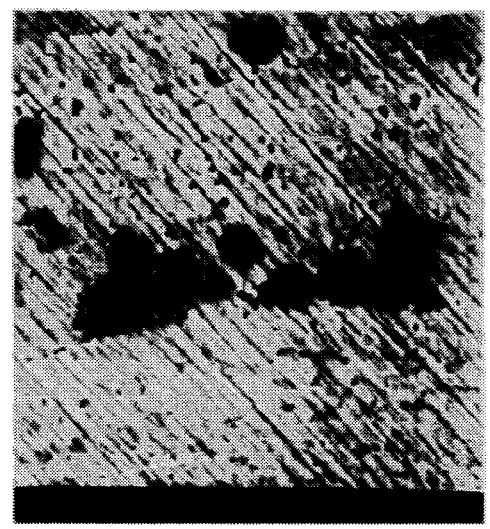
FIG. 32 is a cross-sectional SEM photograph of an alloy manufactured in Comparative Example 7.
Figure 33:
FIG. 33 is a cross-sectional SEM photograph of an alloy manufactured in Comparative Example 8.
Figure 34:
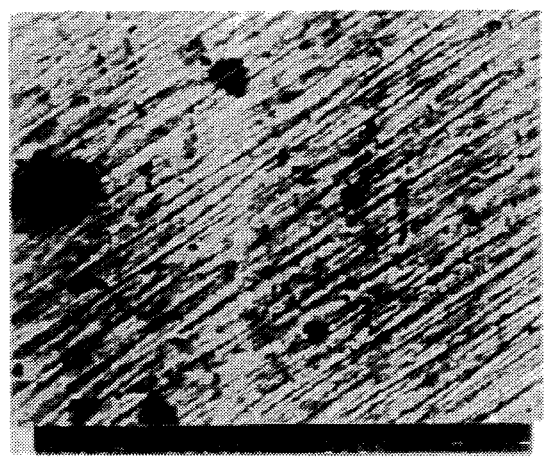
FIG. 34 is a cross-sectional SEM photograph of an alloy manufactured in Comparative Example 9.
Figure 35:
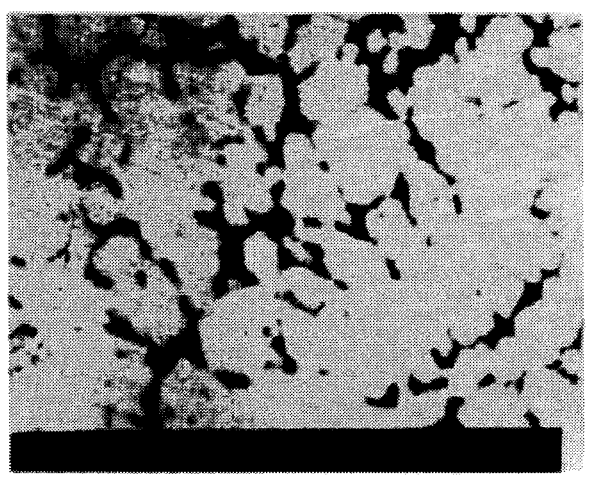
FIG. 35 is a cross-sectional SEM photograph of an alloy manufactured in Comparative Example 10.

FIG. 23 is a schematic view showing a manufacturing apparatus of alloy particles by means of the rotating electrode process method used in the present invention. This apparatus comprises, in a chamber 51, a rotating axis 50 rotated by a driven device (not shown), a chuck 52 projected on the rotating axis 50, the top end of which an electrode rod of raw material alloy 54 is provided, and an electrode rod 53 elected on an opposite side of the chamber 51 to the chuck 52 at a predetermined distance apart from the chuck 52. Alloy particles are manufactured using this apparatus in the following manner. First, the electrode-rod of the raw material alloy 54 is attached to the chuck 52, the rotating axis 50 and the electrode rod of raw material alloy 54 are rotated while an inert gas such as Ar gas is then supplied into the chamber 51. Under this condition, electric voltage is applied and arc discharge is performed between the electrode-rod of the raw material alloy 54 serving as an anode and the electrode rod 53 serving as a cathode. The raw material alloy as an anode is melted by the resulting plasma jet and turned into liquid drops 55, which are scattering around in the chamber 51. The scattered liquid alloy drops are quenched by the inert gas in the chamber 51 and solidify in spherical particles.

The structures of the alloy particles obtained in Examples 6 to 12 and Comparative Examples 6 to 10, were checked by observation of cross-sections thereof. The cross-sectional photographs of the alloy particles of Examples 6 to 12 and Comparative Examples 6 to 10 are shown in FIGS. 24 to 35, respectively. The particles of Example 9 (FIG. 27), Example 10 (FIG. 28), and Comparative Example 6 (FIG. 31) were observed under an optical microscopy, the particles other than above-mentioned particles, were observed using SEM (reflected electron image).

As shown in FIGS. 24 to 30, the alloy particles of Examples 6 to 12 have a main phase and a sub-phase having homogeneous and fine metal texture. As shown in FIGS. 31 to 35, in the alloy particles of Comparative Examples 6 to 10, a sub-phase is present in the form of a relatively large island in a main phase or main phases bind each other and develop into a large continent form.

As described above, it is possible to drastically change a content of a sub-phase and a size or a structure of metal texture by slightly varying the ratio of mother alloy composition used as a starting material of alloy particles, and by varying a quenching rate of the molten metal by selecting atmospheric gas or controlling atmospheric pressure in the chamber. The content of a sub-phase, an average diameter of a main phase, an average width of a sub-phase (fiber width) with respect to individual alloy particles of Examples 6 to 12 and Comparative Examples 6 to 10 are shown in the following Table 1 (Examples 6 to 12) and Table 2 (Comparative Examples 6 to 10), together with a manufacturing methods thereof.

TABLE 1

|  | Example 6 | Example 7 | Example 8 | Example 9 |
|---|---|---|---|---|
| Main Phase | Er$_3$Ni | Er$_3$Ni | Er$_3$Ni | Er$_3$Ni |
| Content of sub-phase (% by volume) | 20 | 15 | 15 | 20 |
| Average Diameter of Main Phase (μm) | 2 to 3 | 2 to 3 | 2 to 4 | 2 to 4 |
| Average width of sub-phase (μm) | 0.3 or less (0.01 or more) | 0.3 or less (0.01 or more) | 0.1 to 0.5 | 0.3 to 0.6 |
| Alloy Particle Diameter (mm) | 0.1 to 0.4 | 0.1 to 0.4 | 0.1 to 0.5 | 0.01 to 0.3 |
| Er/Ni Composition Ratio (% by atom) | 73/27 | 73/27 | 72.5/27.5 | 72/25 |
| Manufacturing Method | RDP | RDP | RDP | Gas Atomization |
| Atmospheric Gas | He | He | Ar | Ar |
| Atmospheric Gas Pressure | high | low | high | high |

|  | Example 10 | Example 11 | Example 12 |
|---|---|---|---|
| Main Phase | Er$_3$Ni | Er$_3$Ni | ErNi |
| Content of sub-phase (% by volume) | 20 | 15 | 20 |
| Average Diameter of Main Phase (μm) | 1 to 2 | 1 to 3 | 3 to 10 |
| Average width of sub-phase (μm) | 0.1 to 0.5 | 0.3 or less (0.01 or more) | 0.5 to 1 |
| Alloy Particle | 0.05 to 0.4 | 0.05 to 0.4 | 0.05 to 0.5 |

TABLE 1-continued

| | | | |
|---|---|---|---|
| Diameter (mm) | | | |
| Er/Ni Composition Ratio (% by atom) | 73/27 | 75/25 | 51/49 |
| Manufacturing Method | REP | REP | REP |
| Atmospheric Gas | Ar | Ar | Ar |
| Atmospheric Gas Pressure | high | high | high |

TABLE 2

| | Comparative Example 6 | Comparative Example 7 | Comparative Example 8 | Comparative Example 9 | Comparative Example 10 |
|---|---|---|---|---|---|
| Main Phase | $Er_3Ni$ | $Er_3Ni$ | $Er_3Ni$ | $Er_3Ni$ | ErNi |
| Content of sub-phase (% by volume) | 10 | 10 | 5 | 3 or less | 20 |
| Average Diameter of Main Phase (μm) | — | — | — | — | 10 to 30 |
| Average Width of sub-phase (μm) | 4 to 7 | 5 to 10 | 4 to 5 | 3 to 6 | 1 to 2 |
| Alloy Particle Diameter (mm) | 0.1 to 0.5 | 0.1 to 0.5 | 0.1 to 0.5 | 0.1 to 0.5 | 0.1 to 0.6 |
| Er/Ni composition Ratio (% by atom) | 73/27 | 73/27 | 75/25 | 78/22 | 50/50 |
| Manufacturing Method | RDP | RDP | RDP | RDP | RDP |
| Atmospheric Gas | Ar | Ar | Ar | Ar | Ar |
| Atmospheric Gas Pressure | very low | low | low | low | low |

In manufacturing methods shown in Tables 1 and 2, RDP indicates the centrifugal atomization method, REP indicates the rotating electrode process method.

Alloy particles of Examples 6 to 12 and Comparative Examples 6 to 10 were subjected to a withstand-load test in the following manner. First, a sample 61 of spherical alloy particles was sandwiched between an upper quartz glass plate 62 and a lower quarts glass plate 63, each having a smooth surface, as shown in FIG. 36. While pressure was being gradually applied onto the quartz glass plate 62, critical load, which is a minimum load inducing brittle fracture of the spherical particles, was measured.

The results are shown in the following Table 3. As is apparent from the Table 3, there is a significant relationship between the form of metal texture and the mechanical strength of the particles.

TABLE 3

| | Average Critical Load (g)* | Aberration from Average value (Distribution range) | Note |
|---|---|---|---|
| Example 6 | 1306 | ±120 | A particle indicating a critical load of more than 2000 g can be seen |
| Example 7 | 900 | ±200 | A particle indicating a critical load of more than 2000 g can be seen |
| Example 8 | 947 | ±200 | A particle indicating a critical load of more than 2000 g can be seen |
| Example 9 | 891 | ±210 | A particle indicating a critical load of more than 2000 g can be seen |
| Example 10 | 1004 | ±360 | A particle indicating a critical load of more than 2000 g can be seen |
| Example 11 | 1146 | ±420 | |
| Example 12 | 1100 | ±240 | |
| Comparative Example 6 | 515 | ±260 | A particle indicating a critical load of more than 100 g can be seen |
| Comparative Example 7 | 578 | ±290 | |
| Comparative Example 8 | 555 | ±410 | |
| Comparative Example 9 | 443 | ±350 | |
| Comparative | 592 | ±280 | A particle indicating |

TABLE 3-continued

| | Average Critical Load (g)* | Aberration from Average value (Distribution range) | Note |
|---|---|---|---|
| Example 10 | | | a critical load of less than 100 g can be seen |

*Average Critical Load: A minimum load by which a brittle fracture can occurs in a spherical particle having a diameter of 300 μm For reference, the withstand-load test was performed with respect to Pb spherical particles as a conventionally used regenerating material. Since Pb is excellent in ductility and malleability compared to an intermetallic compound containing a rare earth element, brittle fracture of the spherical Pb particles was not observed. Whereas, the Pb spherical particles 71 sandwiched between a quartz glass plates 72 and 73 gradually causes plastic deformation proportional to an increase of the load, resulting in flat form, as shown in FIG. 37. The relationship between the degree of load and the ellipticity of the Pb spherical particle (a ratio of a minimum diameter to a maximum diameter of the cross-section taken in the direction of compression) was determined. The results are shown in FIG. 38. It is apparent from FIG. 38 that the Pb particles of 300 μm in diameter are deformed completely in flat and crushed at about 400 g of application load.

From the comparison of particles, the alloy particles as the intermetallic compounds of Examples 6 to 12 and Comparative Examples 6 to 10 are superior in withstand-load strength to the Pb particles. Unlike the particles of Comparative Examples 6 to 10, remarkable improvement in mechanical strength of particles can be observed in the alloy particles of Examples 6 to 12.

The regenerating material having features of the present invention could be attained even by using another rare earth alloys such as $Er_{0.9}Gd_{0.1}Ni$, $Er_{0.7}Ho_{0.3}Ni$, $ErNi_{0.9}Co_{0.1}$, $ErNi_{0.6}Cu_{0.4}$, and $HoNi_{0.5}Cu_{0.5}$, consisting of rare earth elements and transition metals by controlling a manufacturing condition.

What is claimed is:

1. A regenerating material, comprising a rare earth alloy containing a main phase and a sub-phase which differ in content of rare earth elements, wherein a cross section of said main phase has an average diameter of 0.01 μm to 20 μm and a cross section of said sub-phase has an average width of 0.01 μm to 3 μm; and wherein said rare earth alloy has a composition represented by the formula:

$RM_Z$ wherein R is a rare earth element; M is an element selected from the group consisting of Fe, Ni, Co, Cu, Ru, Rh, Pd, Ag, Pt, Au, Al, Ga and In; and Z is $0.001 \leq Z \leq 13$; and wherein said main phase is contained in an amount of 50 to 85% by volume and said sub-phase is contained in an amount of 15 to 50% by volume.

2. A regenerating material, comprising a rare earth alloy containing a main phase and a sub-phase which differ in content of rare earth elements, wherein said material is an aggregate of main phases and sub-phases each present on a surface of said main phase, or an aggregate of the main phase and fibrous sub-phase present in said main phase, wherein a cross section of said main phase has an average diameter of 0.01 μm to 20 μm and a cross section of said sub-phase has an average width of 0.01 μm to 3 μm; and wherein said rare earth alloy has a composition represented by the formula:

$RM_Z$ wherein R is a rare earth element, M is an element selected from the group consisting of Fe, Ni, Co, Cu, Ru, Rh, Pd, Ag, Pt, Au, Al, Ga and In; and Z is $0.001 \leq Z \leq 13$; and wherein said main phase has is contained in an amount of 50 to 85% by volume and said sub-phase is contained in an amount of 15 to 50% by volume.

3. The regenerating material according to claim 1, wherein said main phase is a rare earth alloy having a composition represented by a formula $RM_Z$ where R is a rare earth element, M is a transition metal element or an element of the IIIb group, and Z is $0.4 \leq Z \leq 13$.

4. The regenerating material according to claim 1, wherein said R is at least one rare earth metal selected from the group consisting of Y, La, Ce, Pr, Nd, Pm, Sm, EU, Gd, Tb, Dy, Ho, Er, Tm, Yb and Lu, and M is at least one element selected from the group consisting of Fe, Ni, Co, Cu, Ru, Rh, Pd, Ag, Pt, Au, Al, Ga, and In.

5. The regenerating material according to claim 1, wherein alloy particles having an aspect ratio of 5 or less are used in an amount of 70% or more by weight.

6. The regenerating material according to claim 1, wherein alloy particles having a diameter within a range of 1 to 2000 μm are used in an amount of 70% or more by weight.

7. The refrigerator comprising a coolant gas, a regenerator charged with the regenerating material according to claim 1, and expansion means for expanding said coolant gas.

8. A refrigerator, comprising a coolant gas, a regenerator charged with the regenerating material according to claim 1, and an expansion means for expanding said coolant gas.

9. The regenerating material according to claim 2, wherein a cross section of said main phase has an average diameter of 0.01 μm to 20 μm.

10. The regenerating material according to claim 2, wherein an average width of a cross section of said sub-phase or an average fiber width of a cross section of the said fibrous sub-phase is within a range of 0.01 to 3 μm.

11. The regenerating material according to claim 2, wherein main phase is a rare earth alloy having a composition represented by a formula $RM_Z$ where R is a rare earth element, M is a transition metal element or an element of the IIIb group, and Z is $0.4 \leq Z \leq 13$.

12. The regenerating material according to claim 2 wherein R is at least one rare earth metal selected from the group consisting of Y, La, Ce, Pr, Nd, Pm, Sm, Eu, Gd, Tb, Dy, Ho, Er, Tm, Yb and Lu.

13. The regenerating material according to claim 2, wherein alloy particles having an aspect ratio of 5 or less are used in an amount of 70% or more by weight.

14. The regenerating material according to claim 2, wherein alloy particles having a diameter within a range of 1 to 2000 μm are used in an amount of 70% or more by weight.

\* \* \* \* \*